US012809460B2

(12) United States Patent
Kim et al.

(10) Patent No.: US 12,809,460 B2
(45) Date of Patent: Nov. 24, 2026

(54) ELECTRONIC DEVICE AND METHOD FOR CONTROLLING SCREEN OF DISPLAY IN ELECTRONIC DEVICE

(71) Applicant: SAMSUNG ELECTRONICS CO., LTD., Suwon-si (KR)

(72) Inventors: Sooryuh Kim, Suwon-si (KR); Younghak Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/085,544

(22) Filed: Mar. 20, 2025

(65) Prior Publication Data

US 2025/0216940 A1 Jul. 3, 2025

Related U.S. Application Data

(63) Continuation of application No. PCT/KR2023/015570, filed on Oct. 11, 2023.

(30) Foreign Application Priority Data

Nov. 25, 2022 (KR) ........................ 10-2022-0159918
Dec. 1, 2022 (KR) ........................ 10-2022-0165519

(51) Int. Cl.
*G06F 3/04812* (2022.01)
*G02B 27/00* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .. G06F 3/013; G06F 3/04812; G06F 3/04842; G06F 3/04845; G06F 2203/04803; G02B 27/0093; G02B 27/0172
See application file for complete search history.

(56) References Cited

U.S. PATENT DOCUMENTS

2013/0332878 A1 12/2013 Sung
2014/0317556 A1 10/2014 Ellenich et al.
(Continued)

FOREIGN PATENT DOCUMENTS

CN 108924452 A 11/2018
CN 110417991 A 11/2019
(Continued)

OTHER PUBLICATIONS

Mobfish VR Studio, "360° / VR videos from A-Z: Everything you need to know [Tutorial]", Jun. 14, 2019, url: https://mobfish.net/.
(Continued)

*Primary Examiner* — Afroza Chowdhury
(74) *Attorney, Agent, or Firm* — Sughrue Mion, PLLC

(57) ABSTRACT

Disclosed is an electronic device including a display. The electronic device, based on identifying a selection of a screen recording function while displaying a plurality of windows displaying execution of a plurality of applications on a screen of the display, performs the screen recording function for the screen of the display displaying the plurality of windows. the electronic device, based on detecting a focused window among the plurality of windows while performing the screen recording function for the screen, records the focused window and an unfocused window. The electronic device, based on identifying a termination of the screen recording function, stores a video in which the focused window and the unfocused window among the plurality of windows are recorded in the memory.

14 Claims, 20 Drawing Sheets

(51) Int. Cl.

| | |
|---|---|
| ***G02B 27/01*** | (2006.01) |
| ***G06F 3/01*** | (2006.01) |
| ***G06F 3/04842*** | (2022.01) |
| ***G06F 3/04845*** | (2022.01) |

(52) U.S. Cl.

CPC ...... *G06F 3/04812* (2013.01); *G06F 3/04842* (2013.01); *G06F 3/04845* (2013.01); *G06F 2203/04803* (2013.01)

(56) References Cited

U.S. PATENT DOCUMENTS

| | | | | |
|---|---|---|---|---|
| 2014/0359115 | A1* | 12/2014 | Hayashida | H04L 67/12 709/224 |
| 2015/0220215 | A1 | 8/2015 | Choi et al. | |
| 2017/0212583 | A1* | 7/2017 | Krasadakis | G06F 3/0482 |
| 2018/0239521 | A1* | 8/2018 | Bastide | G06F 3/0481 |
| 2018/0350119 | A1 | 12/2018 | Kocharlakota et al. | |
| 2020/0387540 | A1 | 12/2020 | Chen | |
| 2022/0317824 | A1 | 10/2022 | Lee | |
| 2023/0098395 | A1* | 3/2023 | O'Leary | H04N 7/15 348/14.03 |
| 2023/0185442 | A1 | 6/2023 | Jung et al. | |
| 2023/0216948 | A1 | 7/2023 | Ahn et al. | |
| 2025/0005072 | A1* | 1/2025 | Salowitz | G06F 16/438 |

FOREIGN PATENT DOCUMENTS

| | | | |
|---|---|---|---|
| CN | 111866423 | A | 10/2020 |
| CN | 115002538 | A | 9/2022 |
| EP | 4 177 832 | A1 | 5/2023 |
| JP | 11-194867 | A | 7/1999 |
| KR | 10-2008-0038825 | A | 5/2008 |
| KR | 10-2013-0016655 | A | 2/2013 |
| KR | 10-2015-0092672 | A | 8/2015 |
| KR | 10-2022-0016727 | A | 2/2022 |
| KR | 10-2022-0017065 | A | 2/2022 |
| KR | 10-2022-0056645 | A | 5/2022 |
| KR | 10-2022-0118044 | A | 8/2022 |
| KR | 10-2023-0105645 | A | 7/2023 |
| WO | 2014130464 | A1 | 8/2014 |

OTHER PUBLICATIONS

Spin Digital, "Virtual Reality and 360° Video", Sep. 16, 2022, url: https://spin-digital.com/.

Unity Technologies, "Universal Render Pipeline overview", 2025, url: https://docs.unity3d.com/Packages/com.unity.render-pipelines.universal@12.1/manual/index.html.

International Search Report (PCT/ISA/210) and Written Opinion (PCT/ISA/237) issued on Jan. 18, 2024 by the International Searching Authority in International Patent Application No. PCT/KR2023/015570.

Communication dated Nov. 17, 2025, issued by the European Patent Office in counterpart European Application No. 23894804.6.

Office Action issued Aug. 24, 2026 by the Korean Ministry of Intellectual Property for KR Patent Application No. 10-2022-0165519.

* cited by examiner

ELECTRONIC DEVICE AND METHOD FOR CONTROLLING SCREEN OF DISPLAY IN ELECTRONIC DEVICE

CROSS-REFERENCE TO RELATED APPLICATIONS

This application is a continuation application of International Application No. PCT/KR2023/015570, filed on Oct. 11, 2023, which claims priority to Korean Patent Application No. 10-2022-0159918, filed on Nov. 25, 2022, in the Korean Intellectual Property Office, and Korean Patent Application No. 10-2022-0165519, filed on Dec. 1, 2022, in the Korean Intellectual Property Office, the disclosures of which are incorporated by reference herein in their entireties.

BACKGROUND

1. Field

The disclosure relates to an electronic device and a method of controlling a screen of a display in the electronic device.

2. Description of Related Art

An electronic device such as a smartphone, a tablet, and a laptop is provided with a screen recording function or a screen capture function.

With the screen recording or screen capture function provided by the electronic device, a process of changing a screen of a display in the electronic device may be stored as a video or a screen of the display of the electronic device may be stored as an image, based on a user operation without the trouble of taking pictures through a camera of a separate electronic device.

SUMMARY

According to an aspect of the disclosure, there is provided an electronic device including: a display; at least one processor; and memory storing instructions that, when executed by the at least one processor individually or collectively, cause the electronic device to: based on identifying a selection of a screen recording function while displaying a plurality of windows displaying execution of a plurality of applications on a screen of the display, perform the screen recording function for the screen of the display displaying the plurality of windows; based on detecting a focused window among the plurality of windows while performing the screen recording function for the screen, record the focused window and an unfocused window; and based on identifying a termination of the screen recording function, store a video in which the focused window and the unfocused window among the plurality of windows are recorded in the memory.

The instructions, when executed by the at least one processor individually or collectively, may cause the electronic device to: detect, as the focused window, at least one of a window activated and in use by a selection of a user, a window on which a cursor displayed to control the electronic device through an external device connected to the electronic device is located, or a window on which a gaze of the user lingers for a predetermined time, among the plurality of windows.

The instructions, when executed by the at least one processor individually or collectively, may cause the electronic device to: record a background image displayed as a background of the plurality of windows, while recording the focused window and the unfocused window among the plurality of windows.

The instructions, when executed by the at least one processor individually or collectively, may cause the electronic device to: record by expanding a size of the focused window and reducing a size of the unfocused window among the plurality of windows.

The instructions, when executed by the at least one processor individually or collectively, may cause the electronic device to: record, while displaying the focused window on the screen of the display and not displaying the unfocused window among the plurality of windows.

The instructions, when executed by the at least one processor individually or collectively, may cause the electronic device to: based on identifying a selection of screen capture while displaying the plurality of windows on the screen of the display, detect the focused window among the plurality of windows and store the focused window and the unfocused window as an image.

The instructions, when executed by the at least one processor individually or collectively, may cause the electronic device to: store the image in which a size of the focused window is expanded and a size of the unfocused window is reduced among the plurality of windows.

The instructions, when executed by the at least one processor individually or collectively, may cause the electronic device to: store the image in which the focused window is displayed on the screen of the display and not displaying the unfocused window among the plurality of windows.

The instructions, when executed by the at least one processor individually or collectively, based on the electronic device including a head mounted display (HMD) device, may cause the electronic device to: while performing the screen recording function for the display displaying the plurality of windows in a three-dimensional space according to a selection of the screen recording function, perform the screen recording function, while detecting, as the focused window, at least one of a window selected by a controller communication-connected to the electronic device, a window selected by a hand motion of a user, or a window on which a gaze of the user lingers for a predetermined time, among the plurality of windows.

The instructions, when executed by the at least one processor individually or collectively, may cause the electronic device to: record the three-dimensional space displayed as a background of the plurality of windows as a background image, while recording the focused window and the unfocused window among the plurality of windows.

According to an aspect of the disclosure, there is provided a method of controlling a screen of a display in an electronic device including: based on identifying a selection of a screen recording function while displaying a plurality of windows displaying execution of a plurality of applications on the screen of the display, performing the screen recording function for the screen of the display displaying the plurality of windows; based on detecting a focused window among the plurality of windows while performing the screen recording function for the screen, recording the focused window and an unfocused window; and based on identifying a termination of the screen recording function, storing a video in which the focused window and the unfocused window among the plurality of windows are recorded in a memory of the electronic device.

The method may include detecting, as the focused window, at least one of a window activated and in use by a selection of a user, a window on which a cursor displayed to control the electronic device through an external device connected to the electronic device is located, or a window on which a gaze of the user lingers for a predetermined time, among the plurality of windows.

The method may include recording a background image displayed as a background of the plurality of windows, while recording the focused window and the unfocused window among the plurality of windows.

The method may include recording by expanding a size of the focused window and reducing a size of the unfocused window among the plurality of windows.

The method may include recording, while displaying the focused window on the screen of the display and not displaying the unfocused window among the plurality of windows.

BRIEF DESCRIPTION OF THE DRAWINGS

The above and other aspects and/or features of embodiments of the disclosure will be more apparent from the following description taken in conjunction with the accompanying drawings, in which.

DETAILED DESCRIPTION

Figure 1:
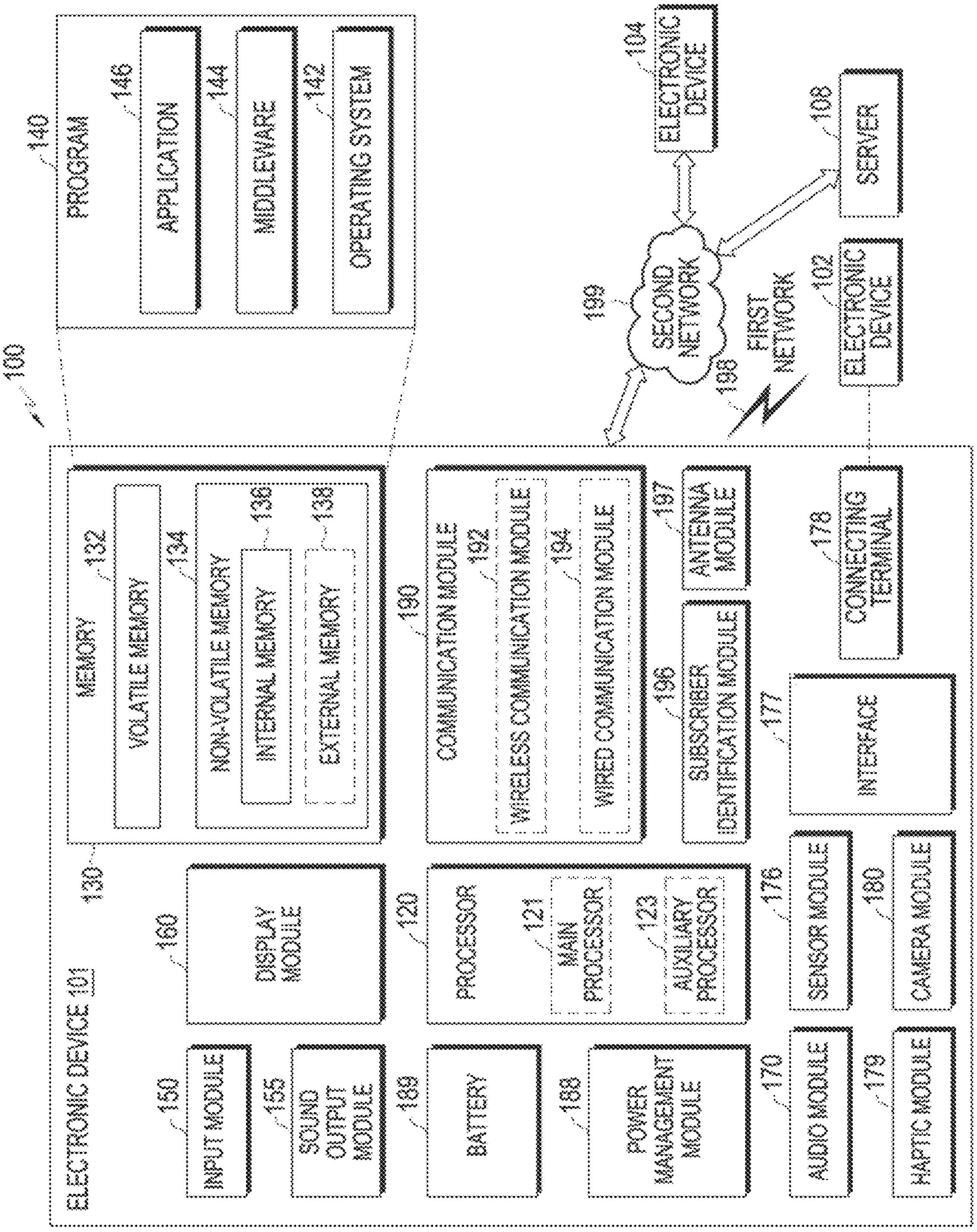
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive plurality of-input and plurality of-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
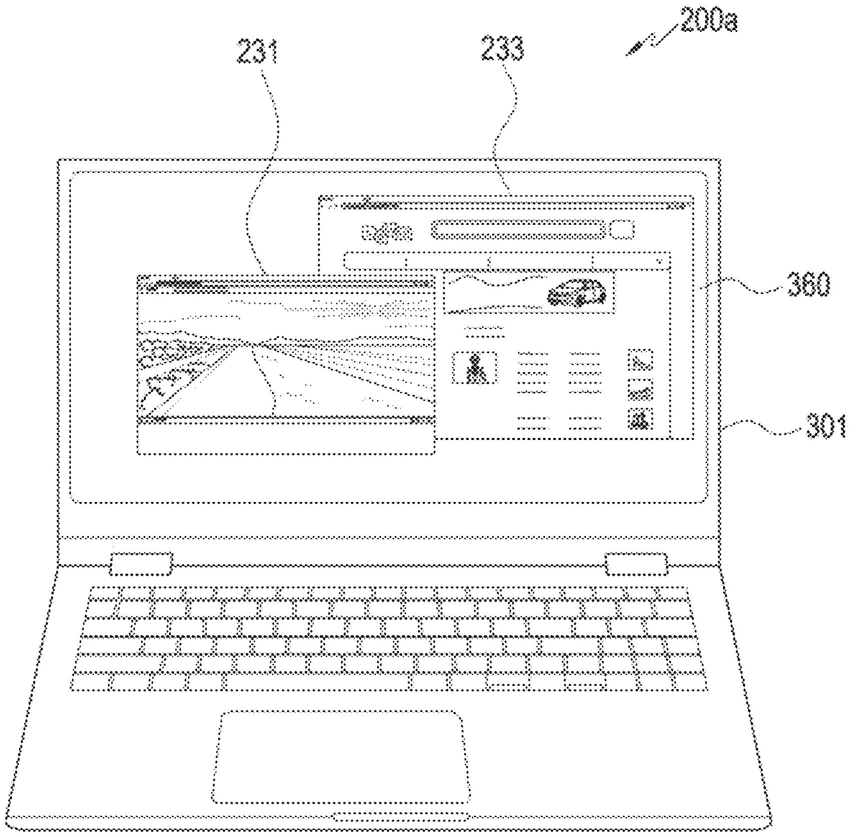
FIG. 2A is a diagram illustrating an operation of controlling a screen of a display in an electronic device according to an embodiment.
Figure 2B:
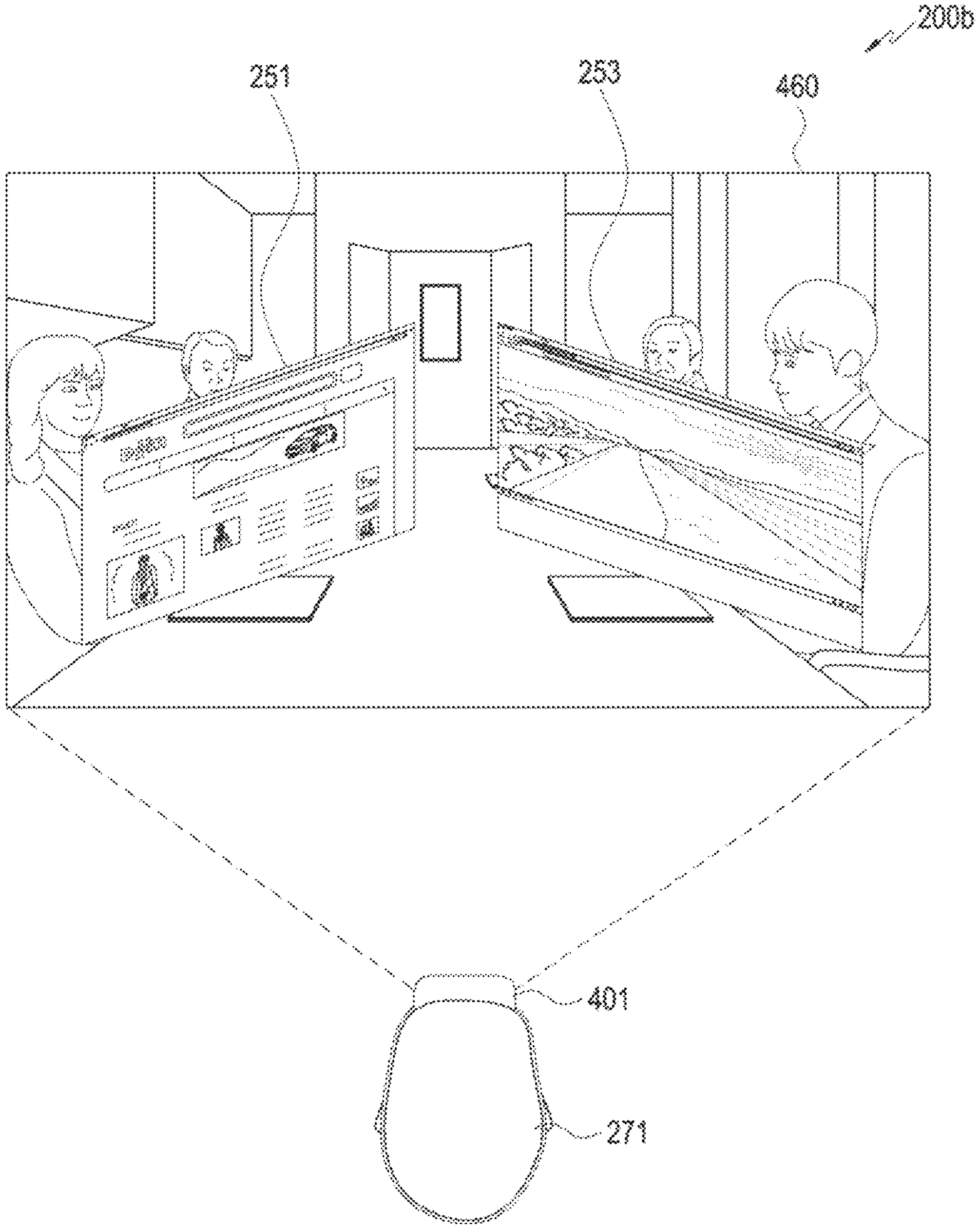
FIG. 2B is a diagram illustrating an operation of controlling a screen of a display in an HMD device according to an embodiment.

FIG. 2A is a diagram 200*a* illustrating an operation of controlling a screen of a display in an electronic device according to an embodiment, and FIG. 2B is a diagram 200*b* illustrating an operation of controlling a screen of a display in a head mounted display (HMD) device according to an embodiment. The electronic device of FIG. 2A may include an electronic device including a display, such as a smartphone, a tablet, and/or a laptop. Although an HMD device is described as an example in FIG. 2B, the same function may also be provided in a device which is mounted on a user's body and capable of providing a three-dimensional space through a display.

Referring to FIG. 2A, upon identifying (e.g., based on identifying) selection of a screen recording function while displaying a first window 231 displaying execution of a first application and a second window 233 displaying execution of a second application on a screen of a display 360, an electronic device 301 may perform the screen recording function.

While recording the screen of the display 360 displaying the first window 231 and the second window 233, upon detection (e.g., based on detecting) of focus on the first window 231, the electronic device 301 may perform the recording by expanding the size of the first window 231 to be greater than the size of the second window 233, and upon detection of focus on the second window 233, the electronic device 301 may perform the recording by expanding the size of the second window 233 to be greater than the size of the first window 231.

While recording the screen of the display 360 displaying the first window 231 and the second window 233, upon detection of focus on the first window 231, the electronic device 301 may perform the recording so that only the first window 231 is displayed on the screen of the display 360 without displaying the second window 233, and upon detection of focus on the second window 233, the electronic device 301 may perform the recording so that only the second window 233 is displayed on the screen of the display 360 without displaying the first window 231.

When the first window 231 or the second window 233 is activated and in use by a user's selection, when a cursor displayed to control the electronic device 301 through an external device (e.g., a mouse connected to the electronic device 301) is located on the first window 231 or the second window 233, or when the user's gaze lingers for a predetermined time on the first window 231 or the second window 233, the electronic device 301 may detect the first window 231 or the second window 233 as a focused window.

Upon identifying termination of the screen recording function, the electronic device 301 may store a video in which the first window 231 or the second window 233 are recorded distinguishably in size when it is focused and when it is not focused, in the memory of the electronic device 301.

The configuration of the electronic device 301 will be described below in detail with reference to FIG. 3.

Referring to FIG. 2B, upon identifying selection of a screen recording function while displaying a first window 251 displaying execution of a first application and a second window 253 displaying execution of a second application in a three-dimensional virtual space on a screen of a display 460, a HMD device 401 worn on the head of a user 271 may perform the screen recording function.

While recording the screen of the display 460 displaying the first window 251 and the second window 253, upon detection of focus on the first window 251, the HMD device 401 may perform the recording by expanding the size of the first window 251 to be greater than the size of the second window 253, and upon detection of focus on the second window 253, the HMD device 401 may perform the recording by expanding the size of the second window 253 to be greater than the size of the first window 251.

While recording the screen of the display 460 displaying the first window 251 and the second window 253, upon detection of focus on the first window 251, the HMD device 401 may perform the recording so that only the first window 251 is displayed on the screen of the display 460 without displaying the second window 253, and upon detection of focus on the second window 253, the HMD device 401 may perform the recording such that only the second window 253 is displayed on the screen of the display 460 without displaying the first window 251.

When the first window 251 or the second window 253 is selected by a controller communication-connected to the HDM device 401, when the first window 251 or the second window 253 is selected by a user's hand motion, or when the user's gaze lingers on the first window 251 or the second window 253, the HMD device 401 may detect the first window 251 or the second window 253 as a focused window.

While performing the recording such that the focused window and the unfocused window of the first window 251 and the second window 253 are distinguishable, the HMD device 401 may also record a three-dimensional space displayed in the background of the first window 251 and the second window 253 as a background image of the first window 251 and the second window 253.

Upon identifying termination of the screen recording function, the HMD device 401 may store a video in which the first window 251 or the second window 253 is distinguishably recorded in size when it is focused and when it is not focused, in memory of the HMD device 401.

The configuration of the HMD device 401 will be described below in detail with reference to FIG. 4.

Figure 3:
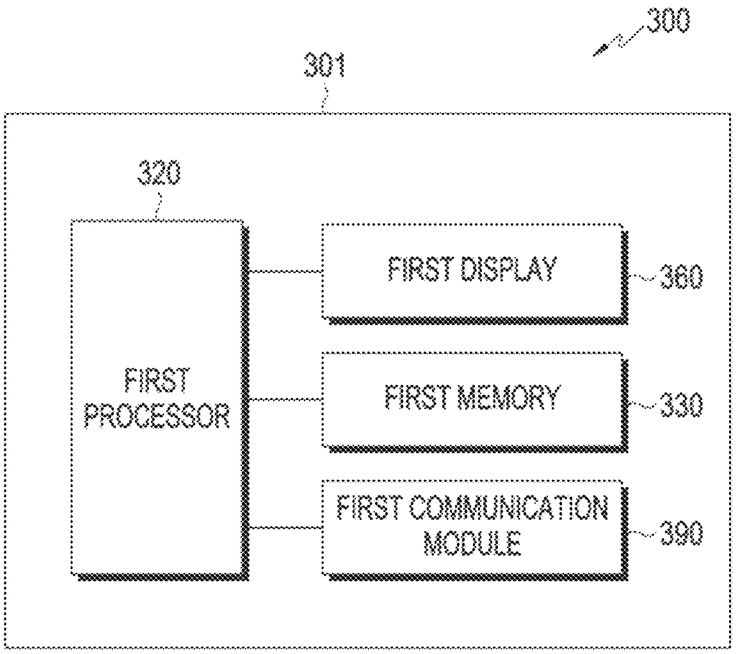
FIG. 3 is a block diagram illustrating an electronic device according to an embodiment.

FIG. 3 is a block diagram 300 illustrating an electronic device according to an embodiment.

Referring to FIG. 3, according to an embodiment, the electronic device 301 may include a first processor 320, first memory 330, a first display 360, and a first communication module 390.

At least some of the components of the electronic device 301 illustrated in FIG. 3 may be identical or similar to the components of the electronic device 101 of FIG. 1, and a redundant description will be omitted below.

According to an embodiment, the first processor 320 may be implemented substantially the same as or similar to the processor 120 of FIG. 1.

According to an embodiment, upon identifying selection of the screen recording function while displaying a plurality of windows displaying execution of a plurality of applications, respectively, the first processor 320 may distinguishably record a focused window and an unfocused window among the plurality of windows during execution of the screen recording function.

According to an embodiment, upon identifying selection of the screen recording function while displaying the plurality of windows on a screen of the first display 360, the first processor 320 may perform the recording function for the screen of the first display 360 displaying the plurality of windows.

According to an embodiment, upon detection of a focused window among the plurality of windows while performing the recording function for the screen of the first display 360, the first processor 320 may perform the recording by expanding the size of the focused window and reducing the size of an unfocused window. For example, the first processor 320 may perform the recording by adjusting the size of the focused window and the size of the unfocused window to a ratio of 8:2.

According to an embodiment, upon detection of a focused window among the plurality of windows while performing the recording function for the screen of the first display 360, the first processor 320 may perform the recording such that only the focused window is displayed on the screen of the first display 360.

According to an embodiment, the first processor 320 may detect, as a focused window, at least one of a window activated and in use by a user's selection, a window on which a cursor displayed to control the electronic device through an external device connected to the electronic device is located, or a window on which the user's gaze lingers among the plurality of windows.

According to an embodiment, while performing the recording function for the screen of the first display 360, the first processor 320 may record a background image displayed as a background of the plurality of windows, together with the plurality of windows.

According to an embodiment, while performing the recording function for the screen of the first display 360, the first processor 320 may record the background image displayed as the background of the plurality of windows together with the plurality of windows by blacking, dimming, or blurring the background image based on the user's selection.

According to an embodiment, upon identifying termination of the screen recording function while performing the recording function for the screen of the first display 360 displaying the plurality of windows, the first processor 320 may store a video in which the focused window and the unfocused window are distinguishably recorded among the plurality of windows, in the first memory 330.

According to an embodiment, upon identifying selection of playback of the video recorded and stored by the screen recording function such which that the focused window and the unfocused window are distinguishable among the plurality of windows displayed on the screen of the first display 360, the first processor 320 may display the focused window and the unfocused window distinguishably among the plurality of windows on the screen of the first display 360.

According to an embodiment, the first processor 320 may play back the video while displaying the window focused during the execution of the screen recording function in an expanded size and the window unfocused during the execution of the screen recording function in a reduced size among the plurality of windows.

According to an embodiment, the first processor 320 may play back the video while displaying only the window focused during the execution of the screen recording function among the plurality of windows on the screen of the first display 360.

According to an embodiment, the first processor 320 may transmit the video recorded and stored by the screen recording function such that the focused window and the unfocused window are distinguishable among the plurality of windows displayed on the screen of the first display 360, to an external electronic device (e.g., the HMD device 401 of FIG. 2B) through the first communication module 390.

According to an embodiment, the first processor 320 may receive a video stored through the screen recording function from an external electronic device (e.g., the HMD device 401 of FIG. 2B) through the first communication module 390.

According to an embodiment, upon identifying selection of playback of the video received from the external electronic device, the first processor 320 may play back the video received from the external electronic device, while displaying a window focused during the execution of the screen recording function in an expanded size and a window unfocused during the execution of the screen recording function in a reduced size among a plurality of windows on the screen of the first display 360.

According to an embodiment, upon identifying selection of playback of the video received from the external electronic device, the first processor 320 may play back the video received from the external electronic device, while displaying only the window focused during the execution of the screen recording function among the plurality of windows on the screen of the first display 360.

According to an embodiment, upon identifying selection of screen capture while displaying the plurality of windows on the screen of the first display 360, the first processor 320 may store, in the first memory 330, an image in which the focused window and the unfocused window are distinguished among the plurality of windows.

According to an embodiment, the first processor 320 may store, in the first memory 330, an image in which the size of the focused window is expanded and the size of the unfocused window is reduced among the plurality of windows.

According to an embodiment, the first processor 320 may store, in the first memory 330, an image in which only the focused window is displayed without displaying the unfocused window among the plurality of windows on the screen of the first display.

According to an embodiment, the first memory 330 may be implemented substantially the same as or similar to the memory 130 of FIG. 1.

According to an embodiment, the first memory 330 may store a video recorded and stored by the screen recording function such that the focused window and the unfocused window are distinguished among the plurality of windows displayed on the screen of the first display 360.

According to an embodiment, the first display 360 may be implemented substantially the same as or similar to the display module 160 of FIG. 1.

According to an embodiment, a user-selected video may be played back while displaying a window focused during execution of the screen recording function in an expanded size and a window unfocused during the execution of the screen in a reduced size among a plurality of windows on the screen of the first display 360.

According to an embodiment, the first communication module 390 may be implemented substantially the same as or similar to the communication module 190 of FIG. 1.

According to an embodiment, the first communication module 390 may be implemented substantially the same as or similar to the communication module 190 of FIG. 1, and include a plurality of communication circuits using different communication technologies.

According to an embodiment, the first communication module 390 may include at least one of a wireless LAN module (not shown) or a short-range communication module (not shown), and the short-range communication module (not shown) may include an ultra wide band (UWB) communication module, a Wi-Fi communication module, an NFC communication module, a Bluetooth legacy communication module, and/or a BLE communication module.

Figure 4:
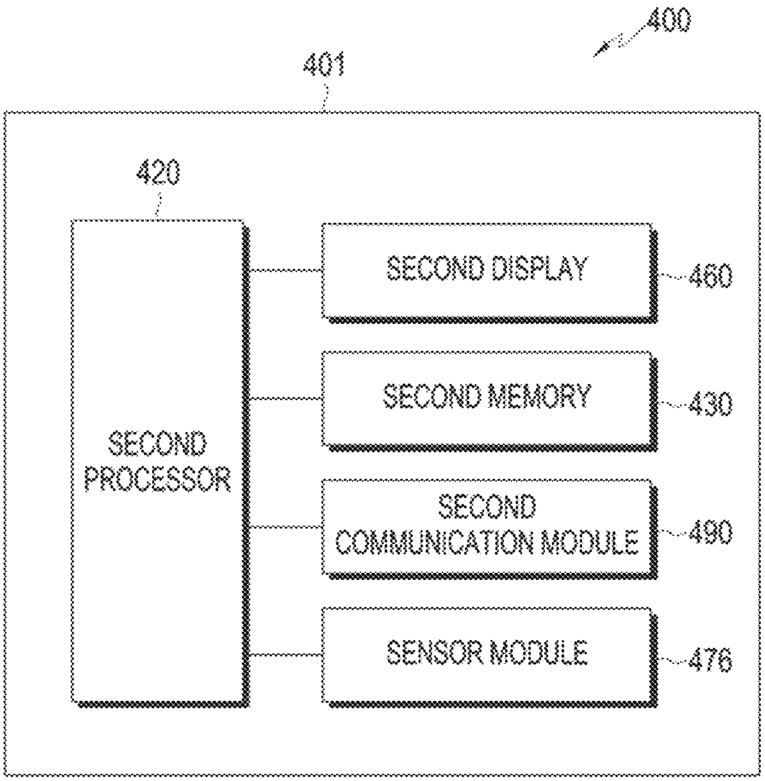
FIG. 4 is a block diagram illustrating an HMD device according to an embodiment.

FIG. 4 is a block diagram 400 illustrating an HMD device according to an embodiment.

Referring to FIG. 4, according to an embodiment, the HMD device 401 may include a second processor 420, second memory 430, a second display 460, a second communication module 490, and a sensing module 476.

At least some of the components of the electronic device 401 illustrated in FIG. 4 may be identical or similar to the components of the electronic device 101 of FIG. 1, and a redundant description will be omitted below.

According to an embodiment, the second processor 420 may be implemented substantially the same as or similar to the processor 120 of FIG. 1.

According to an embodiment, upon identifying selection of the screen recording function while displaying a plurality of windows displaying execution of a plurality of applications, respectively the second processor 420 may record a focused window and an unfocused window distinguishably among the plurality of windows during execution of the screen recording function.

According to an embodiment, upon identifying selection of the screen recording function while displaying the plurality of windows on a screen of the second display 460, the second processor 420 may perform the recording function for the screen of the second display 460 displaying the plurality of windows.

According to an embodiment, upon detection of a focused window among the plurality of windows while performing the recording function for the screen of the second display 460, the second processor 420 may perform the recording by expanding the size of the focused window and reducing the size of an unfocused window. For example, the second processor 420 may perform the recording by adjusting the size of the focused window and the size of the unfocused window to a ratio of 8:2.

According to an embodiment, upon detection of a focused window among the plurality of windows while performing the recording function for the screen of the second display 460, the second processor 420 may perform the recording such that only the focused window is displayed on the screen of the second display 460.

According to an embodiment, while displaying the plurality of windows in a three-dimensional space, the second processor 420 may detect, as a focused window, at least one of a window selected by a controller communication-connected to the electronic device, a window selected by the user's hand motion, or a window on which the user's gaze lingers.

According to an embodiment, while performing the recording function for the screen of the second display 460, the second processor 420 may record a three-dimensional space displayed as a background of the plurality of windows as a background image, together with the plurality of windows.

According to an embodiment, the second processor 420 may display the plurality of windows in a virtual reality (VR) mode on the screen of the second display 460, and record a three-dimensional virtual space displayed as a background of the plurality of windows as a background image, together with the plurality of windows during the execution of the screen recording function in the VR mode in which the plurality of windows are displayed.

According to an embodiment, the second processor 420 may display the plurality of windows in an augmented reality (AR) mode on the screen of the first display 460, and record a real space displayed as a background of the plurality of windows as a background image, together with the plurality of windows during the execution of the screen recording function in the AR mode in which the plurality of windows are displayed.

According to an embodiment, upon detection of termination of the screen recording function while performing the recording function for the screen of the second display 460 displaying the plurality of windows in the three-dimensional space, the second processor 420 may store, in the second memory 430, a video in which the focused window and the unfocused window are distinguishably recorded among the plurality of windows.

According to an embodiment, the second processor 420 may store the video in which the focused window and the unfocused window are distinguishably recorded among the plurality of windows, together with the background image of the three-dimensional space, in the form of a 360-degree video, and the 360-degree video may have a mono form with a 2:1 aspect ratio or a stereo form with a 1:1 aspect ratio. For example, the second processor 420 may store the 360-degree video in an mp4 format encoded with an h264 codec. For example, the second processor 420 may store the 360-degree video in universal render pipeline (URP).

According to an embodiment, while performing the recording function for the screen of the second display 460 displaying the plurality of windows in the three-dimensional space, when a frame size is 1:1, the second processor 420 may determine the video as stereoscopic, when the frame size is 2:1, determine the video as monoscopic, and when the frame size is 4:1, determine the video as monoscopic or stereoscopic, and identify the three-dimensional space displayed as the background of the plurality of windows and record the three-dimensional space as a background image, together with the plurality of windows. The second processor 420 may provide a function of editing an output layout, an output horizontal field of view (FOV), and an output vertical FOV field to allow the user to select a stereoscopic or monoscopic layout.

Although lacking a three-dimensional effect, the monoscopic may facilitate production and distribution because it may greatly increase a pixel density and a frame rate. When sharing is required between users, the monoscopic may be set as a default format for a 360-degree video. For example, 180-degree videos or 360-degree videos may be shared, uploaded, and viewed on most VR applications available with VR headsets, such as Facebook and YouTube.

The stereoscopic, which is a format having a 360° overview of the surroundings and creating a three-dimensional effect for nearby objects, may create both horizontal and vertical parallax to provide a true depth and perspective to a scene, regardless of a viewing angle. The stereoscopic may be used for recording in a game environment due to excellent immersion, and when a flat 360-degree video is taken to a surround workstation plug-in in a digital audio workstation (DAW) and placed in the DAW, it may include surround audio.

For example, the second processor 420 may store the 360-degree video in a high dynamic range (HDR) format. The HDR, which is one of the environment maps of Unity, may clearly display images, and thus may be used as a screen recording format, when various streaming services are used.

According to an embodiment, upon identifying playback of the video recorded and stored by the screen recording function such that the focused window and the unfocused window are distinguishable among the plurality of windows displayed in the three-dimensional space, the second processor 420 may play back the stored video, while displaying the focused window and the unfocused window distinguishably among the plurality of windows in the third-dimensional space on the screen of the second display 460.

According to an embodiment, the second processor 420 may play back the video while displaying the window focused during execution of the screen recording function in an expanded size and a window unfocused during the execution of the screen recording function in a reduced size, together with the background image of the three-dimensional space.

According to an embodiment, the second processor 420 may play back the video while displaying only the window focused during the execution of the screen recording function among the plurality of windows in the three-dimensional space on the screen of the second display 360.

According to an embodiment, the second processor 420 may transmit the video recorded and stored by the screen recording function such that the focused window and the unfocused window are distinguishable among the plurality of windows displayed in the three-dimensional space to an external electronic device (e.g., the electronic device 301 of FIG. 2A) through the second communication module 490.

According to an embodiment, the second processor 420 may receive a video stored by the screen recording function from an external electronic device (e.g., the electronic device 301 of FIG. 2B) through the second communication module 490.

According to an embodiment, upon identifying selection of playback of the video received from the external electronic device, the second processor 420 may play back the video received from the external electronic device, while displaying, on the screen of the second display 460, a window focused during execution of the screen recording function in an expanded size and a window unfocused during the execution of the screen recording function in a reduced size among a plurality of windows having a three-dimensional virtual space as a background image.

According to an embodiment, upon identifying selection of playback of the video received from the external electronic device, the first processor 320 may play back the video received from the external electronic device, while displaying only the window focused during the execution of the screen recording function among the plurality of windows having the three-dimensional virtual space as the background image on the screen of the second display 460.

According to an embodiment, upon identifying selection of screen capture while displaying the plurality of windows in the three-dimensional space on the screen of the second display 460, the second processor 420 may store, in the second memory 430, an image captured such that a focused window and an unfocused window are distinguishable among the plurality of windows.

According to an embodiment, the second processor 420 may store, in the second memory 430, an image captured such that the size of the focused window is expanded and the size of the unfocused window is decreased among the plurality of windows.

According to an embodiment, the second processor 420 may capture and store the three-dimensional space displayed as the background of the plurality of windows as a background image, together with the plurality of windows.

According to an embodiment, the second processor 420 may store an image captured in a three-dimensional virtual space as a 360-degree image, and may store it in, for example, a png format, a jpeg format, or a gif format. The second processor 420 may store the 360-degree image in a 2:1 aspect ratio, when it is a mono image, and in a 1:1 aspect ratio, when it is a stereo image.

According to an embodiment, the second memory 430 may be implemented substantially the same as or similar to the memory 130 of FIG. 1.

According to an embodiment, the second memory 430 may store a video recorded by the screen recording function such that a focused window and an unfocused window are distinguishable among a plurality of windows displayed in a three-dimensional space.

According to an embodiment, the second display 460 may be implemented substantially the same as or similar to the display module 160 of FIG. 1.

According to an embodiment, a user-selected video may be played while displaying a window focused during execution of the screen recording function in an expanded size and a window unfocused during the execution of the screen recording function in a reduced size among a plurality of windows displayed in a three-dimensional space on the screen of the second display 460.

According to an embodiment, the second communication module 490 may be implemented substantially the same as or similar to the communication module 190 of FIG. 1.

According to an embodiment, the second communication module 490 may be implemented substantially the same as or similar to the communication module 190 of FIG. 1, and include a plurality of communication circuits using different communication technologies.

According to an embodiment, the second communication module 490 may include at least one of a wireless LAN module (not shown) or a short-range communication module (not shown), and the short-range communication module (not shown) may include a UWB communication module, a Wi-Fi communication module, an NFC communication module, a Bluetooth legacy communication module, and/or a BLE communication module.

In an embodiment, the sensor module 476 may include a component for obtaining information about movement and/or posture of the HMD device 401. For example, the sensor module 476 may include an acceleration sensor (e.g., a 6-axis acceleration sensor) and/or a gyro sensor, which may obtain information about the movement, rotation, and/or direction of the HMD device 401.

Figure 5:
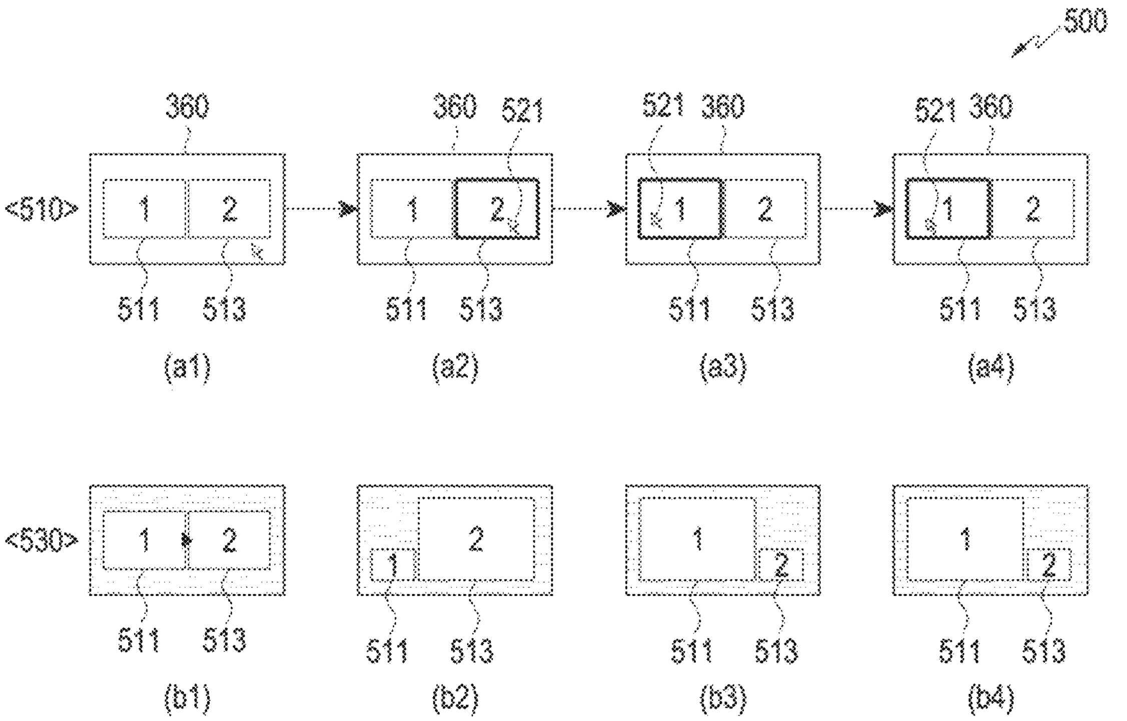
FIG. 5 is a diagram illustrating recording in an electronic device according to an embodiment.

FIG. 5 is a diagram 500 illustrating screen recording in an electronic device according to an embodiment.

Referring to FIG. 5, <510> represents a screen of a display that displays a plurality of windows in the electronic device, and <530> represents a process of recording a screen of the display that displays the plurality of windows in the electronic device.

Upon identifying selection of the screen recording function while displaying a first window 511 indicating execution of a first application and a second window 513 indicating execution of a second application on the screen of the display 360 (e.g., the first display 360 of FIG. 3) of the electronic device (e.g., the electronic device 301 of FIG. 2A and/or the electronic device 301 of FIG. 3), the electronic device may perform the recording function for the screen of the display 360 displaying the first window 511 and the second window 513. The electronic device may record the screen of the display 360 displaying the first window 511 and the second window 513, as illustrated in (b1), while displaying the first window 511 and the second window 513 on the screen of the display 360, as illustrated in (a1).

When a cursor 521 displayed to control the electronic device through an external device (e.g., a mouse) connected to the electronic device is located on the second window 513 during the execution of the screen recording function, as illustrated in (a2), the electronic device may detect that the second window 513 is focused and record the screen of the display 360 by reducing the size of the unfocused first window 511 and expanding the size of the focused second window 513, as illustrated in (b2).

When the cursor 521 displayed to control the electronic device through the external device (e.g., a mouse) connected to the electronic device is located on the first window 511 during the execution of the screen recording function, as illustrated in (a3), the electronic device may detect that the first window 511 is focused and record the screen of the display 360 by reducing the size of the unfocused second window 513 and expanding the size of the focused first window 511, as illustrated in (b3).

When the position of the cursor 521 displayed to control the electronic device through the external device (e.g., a mouse) connected to the electronic device is maintained on the first window 511 during the execution of the screen recording function, as illustrated in (a4), the electronic device may record the screen of the display 360 by reducing the size of the unfocused second window 512 and expanding the size of the focused first window 511, as illustrated in (b4).

Figure 6:
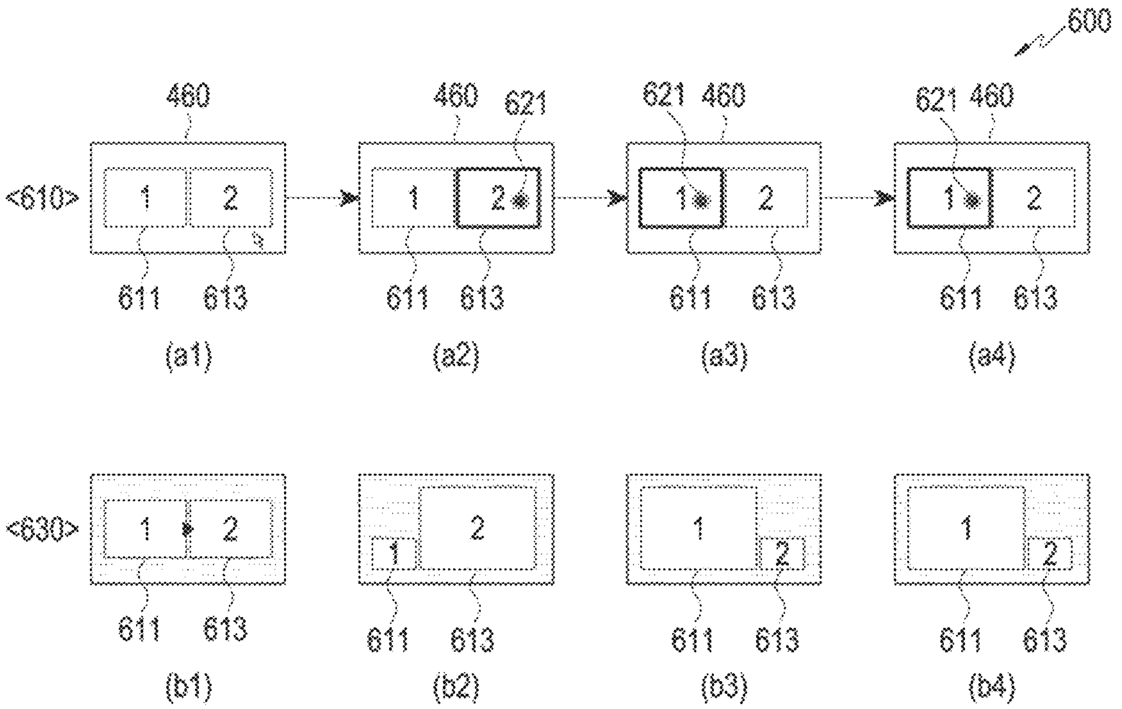
FIG. 6 is a diagram illustrating recording in an HMD device according to an embodiment.

FIG. 6 is a diagram 600 illustrating screen recording in an HMD device according to an embodiment.

Referring to FIG. 6, <610> represents a screen of a display that displays a plurality of windows in the HMD device, and <630> represents a process of recording the screen of the display that displays the plurality of windows in the HMD device.

Upon identifying selection of the screen recording function while displaying a first window 611 displaying execution of a first application and a second window 613 displaying execution of a second application on the screen of the display 460 (e.g., the second display 460 of FIG. 4) of the HMD device, the HMD device (e.g., the electronic device 401 of FIG. 2B and/or the HMD 401 of FIG. 4) may perform the recording function for the screen of the display 460 displaying the first window 611 and the second window 613. While displaying the first window 611 and the second window 613 on the screen of the display 460, as illustrated in (a1), the HMD device may record the screen of the display 460 displaying the first window 611 and the second window 613, as illustrated in (b1).

Upon identifying selection 621 of the second window 613 through a controller communication-connected to the HMD device during the execution of the screen recording function, as illustrated in (a2), the HMD device may detect the second window 613 as a focused window and record the screen of the display 460 by reducing the size of the unfocused first window 611 and expanding the size of the focused second window 613, as illustrated in (b2).

Upon identifying selection 621 of the first window 611 through the controller communication-connected to the HMD device during the execution of the screen recording function, as illustrated in (a3), the HMD device may detect the first window 611 as a focused window and record the screen of the display 460 by reducing the size of the unfocused second window 613 and expanding the size of the focused first window 611, as illustrated in (b3).

Upon identifying selection 621 of the first window 611 through the controller communication-connected to the HMD device during the execution of the screen recording function, as illustrated in (a4), the HMD device may detect the first window 611 as a focused window and record the screen of the display 460 by reducing the size of the unfocused second window 613 and expanding the size of the focused first window 611, as illustrated in (b4).

Figure 7A:
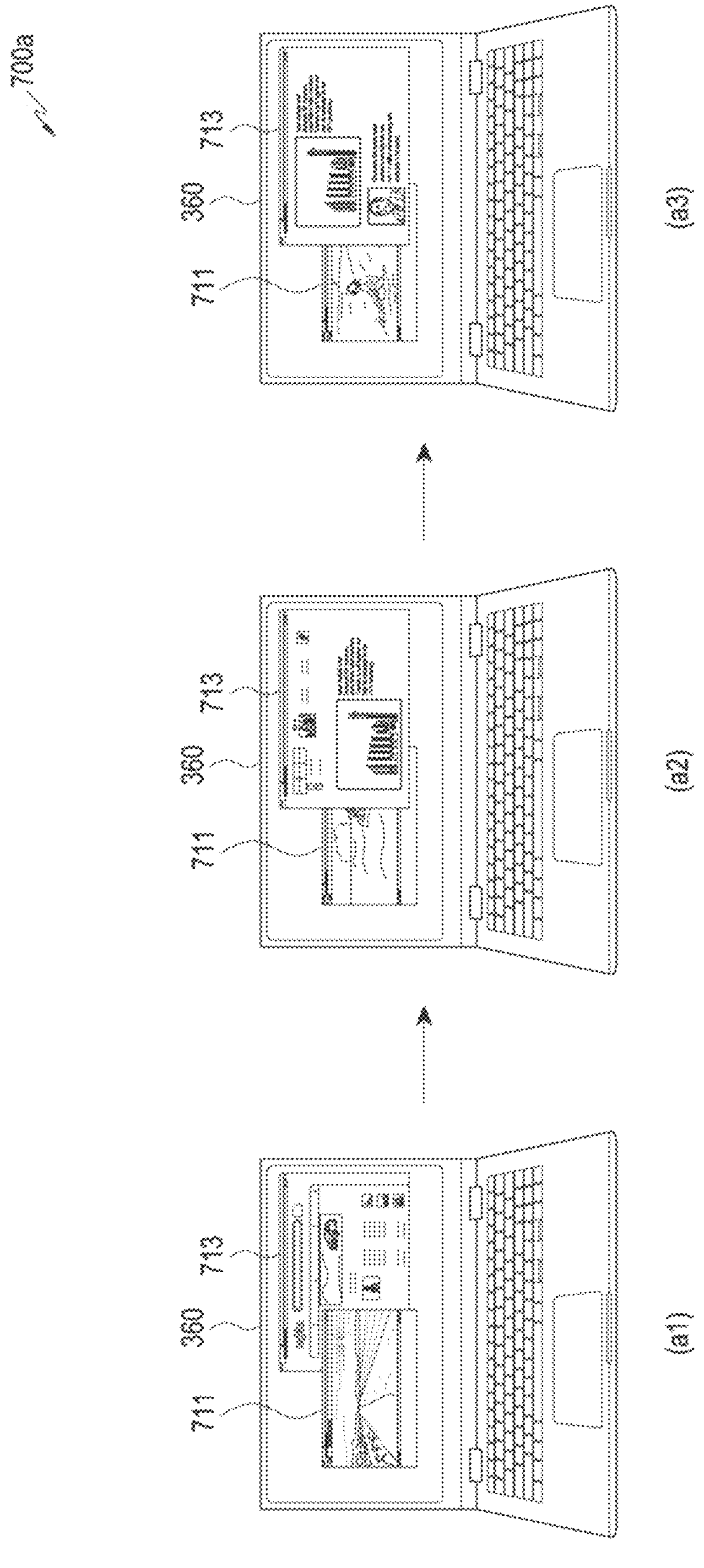
FIGS. 7A and 7B are diagrams illustrating an operation of recording and playing back a screen in an electronic device according to an embodiment.
Figure 7B:
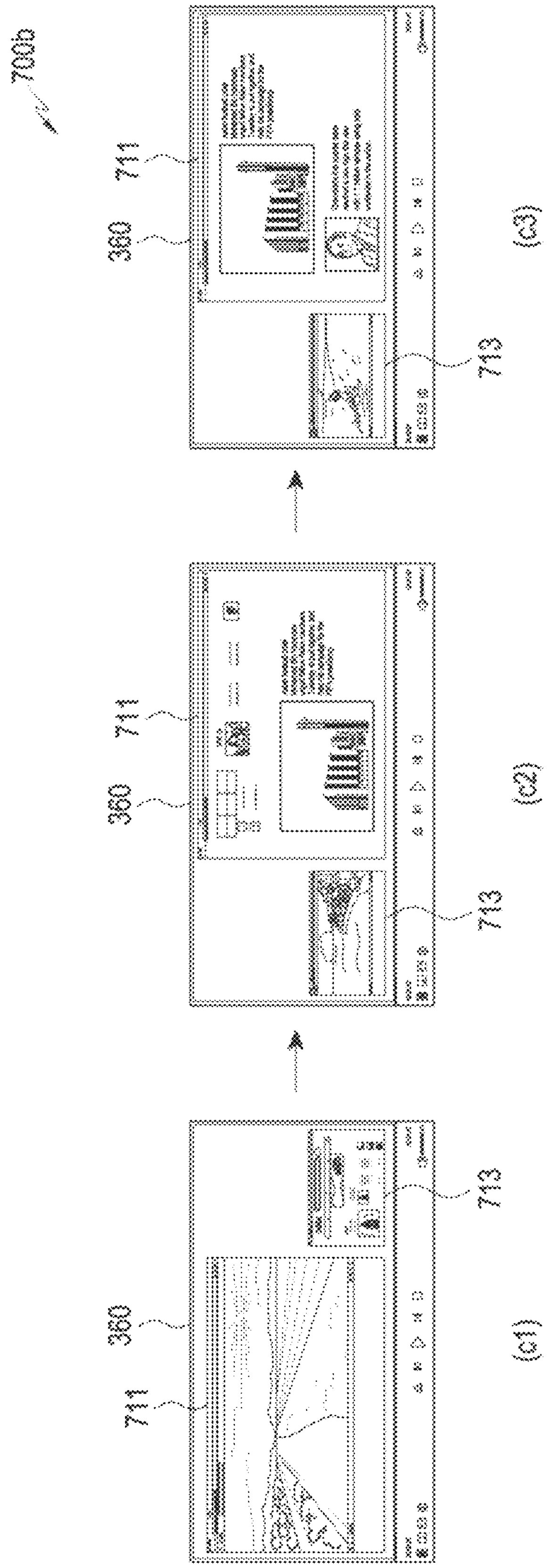

FIGS. 7A and 7B are diagrams 700*a* and 700*b* illustrating an operation of recording and playing back a screen in an electronic device according to an embodiment.

Referring to the above FIG. 7A, upon identifying selection of the screen recording function while displaying a first window 711 displaying execution of a first application and a second window 713 displaying execution of a second application on the display 360 (e.g., the first display 360 of FIG. 3) of the electronic device (e.g., the electronic device 301 of FIG. 2A and/or the electronic device 301 of FIG. 3), the electronic device may perform the recording function for the screen of the display 360 displaying the first window 711 and the second window 713.

Upon identifying that the gaze of the user of the electronic device lingers on the first window 711 out of the first window 711 and the second window 713 on the screen of the display 360 by using a gaze tracking function during the execution of the screen recording function, as illustrated in (a1), the electronic device may detect the first window 711 as a focused window and record the screen of the display 360 by reducing the size of the unfocused second window 713 and expanding the size of the focused first window 711.

Upon identifying that the gaze of the user of the electronic device lingers on the second window 713 out of the first window 711 and the second window 713 on the screen of the display 360 by using the gaze tracking function during the execution of the screen recording function, as illustrated in (a2), the electronic device may detect the second window 713 as a focused window and record the screen of the display 360 by reducing the size of the unfocused first window 711 and expanding the size of the focused second window 713.

Upon identifying that the gaze of the user of the electronic device lingers on the second window 713 out of the first window 711 and the second window 713 on the screen of the display 360 by using the gaze tracking function during the execution of the screen recording function, as illustrated in (a3), the electronic device may detect the second window 713 as a focused window and record the screen of the display 360 by reducing the size of the unfocused first window 711 and expanding the size of the focused second window 713.

Upon identifying termination of the screen recording function, the electronic device may store a first video in which the focused window and the unfocused window out of the first window 711 and the second window 713 are distinguishably recorded, in the memory (e.g., the first memory 330 of FIG. 3) of the electronic device.

Referring to the above FIG. 7B, upon identifying selection of playback of the first video, which has been recorded and stored by the screen recording function such that the focused window and the unfocused window out of the first window 711 and the second window 713 displayed on the screen of the display 360 (e.g., the first display 360 of FIG. 3) are distinguishable, the electronic device (e.g., the electronic device 301 of FIG. 2A and/or the electronic device 301 of FIG. 3) may play the first video, while displaying the first window 711 focused during the execution of the screen recording function in an expanded size and the second window 713 unfocused during the execution of the screen recording function in a reduced size, as illustrated in (c1).

The electronic device may play back the first video, while displaying the second window 713 focused during the execution of the screen recording function in an expanded size and the first window 711 unfocused during the execution of the screen recording function in a reduced size, as illustrated in (c2).

The electronic device may play back the first video, while displaying the second window 713 focused during the execution of the screen recording function in an expanded size and the first window 711 unfocused during the execution of the screen recording function in a reduced size, as illustrated in (c3).

Figure 8A:
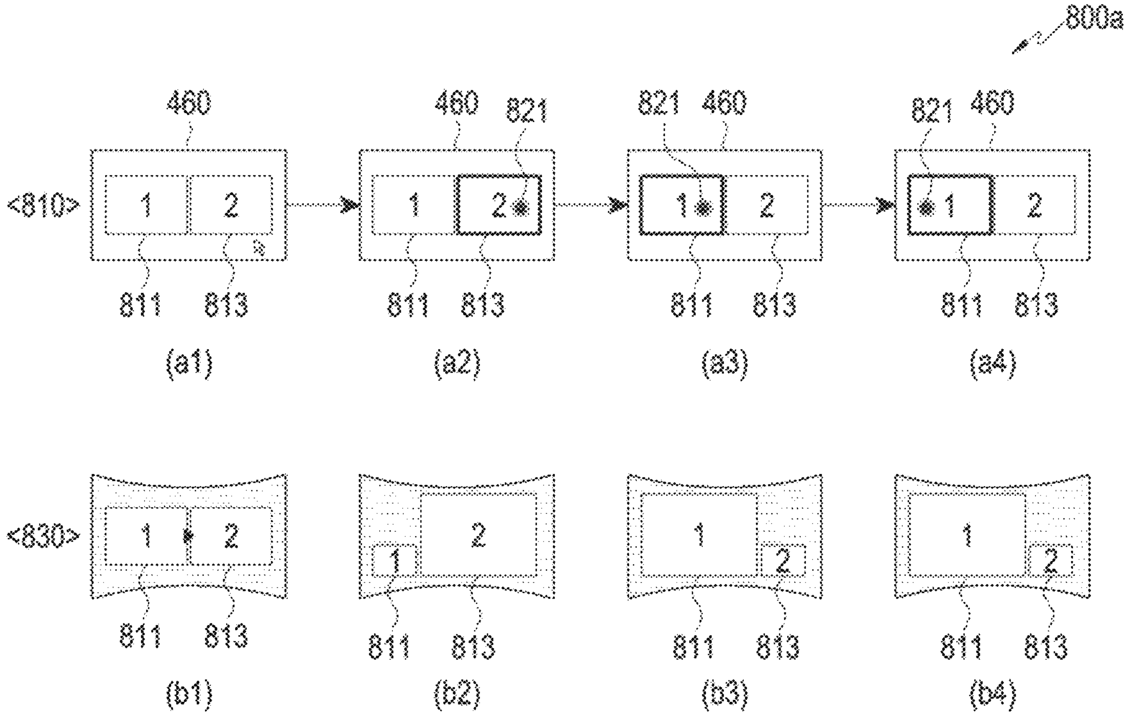
FIGS. 8A and 8B are diagrams illustrating an operation of playing back a video stored in an HMD device on an electronic device according to an embodiment.
Figure 8B:
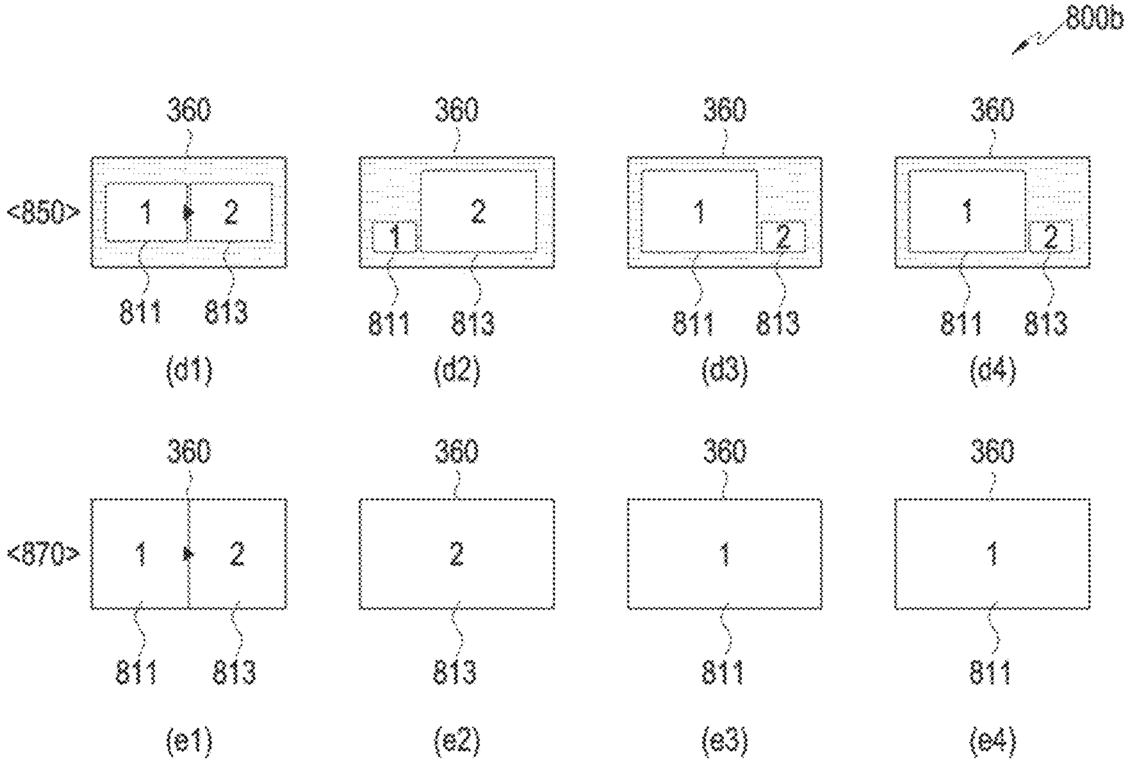

FIGS. 8A and 8B are diagrams 800*a* and 800*b* illustrating an operation of playing back a video stored in an HMD device on an electronic device according to an embodiment.

Referring to FIG. 8A, <810> represents a screen of a display displaying a plurality of windows in an HMD device, and <830> represents a process of recording the screen of the display displaying the plurality of windows on the HMD device.

Upon identifying selection of the screen recording function while displaying a first window 811 displaying execution of a first application and a second window 813 displaying execution of a second application on a screen of the display 460 (e.g., the second display 460 of FIG. 4) of the HMD device (e.g., the HMD device 401 of FIG. 2B and/or the HMD device of FIG. 4), the HMD device may perform the recording function for the screen of the display 460 displaying the first window 811 and the second window 813. While displaying the first window 811 and the second window 813 on the screen of the display 460 as illustrated in (a1), the HMD device may record the screen of the display 460 displaying the first window 811 and the second window 813, as illustrated in (b1).

Upon identifying selection 821 of the second window 813 through a controller communication-connected to the HMD device during the execution of the screen recording function, as illustrated in (a2), the HMD device may detect the second window 813 as a focused window and record the screen of the display 460 by reducing the size of the unfocused first window 811 and expanding the size of the focused second window 813, as illustrated in (b2).

Upon identifying selection 821 of the first window 811 through the controller communication-connected to the HMD device during the execution of the screen recording function, as illustrated in (a3), the HMD device may detect the first window 811 as a focused window and record the screen of the display 460 by reducing the size of the unfocused second window 813 and expanding the size of the focused first window 811, as illustrated in (b3).

Upon identifying selection 821 of the first window 811 through the controller communication-connected to the HMD device during the execution of the screen recording function, as illustrated in (a4), the HMD device may detect the first window 811 as a focused window and record the screen of the display 460 by reducing the size of the unfocused second window 813 and expanding the size of the focused first window 811, as illustrated in (b4).

Upon identifying termination of the screen recording function, the HMD device may store a first video recorded in which the focused window and the unfocused window out of the first window 811 and the second window 813 are distinguishably recorded, in the memory (e.g., the second memory 430 of FIG. 4) of the HMD device.

The HMD device may transmit the first video to an electronic device (e.g., the electronic device 301 of FIG. 2A and/or the electronic device 301 of FIG. 3) through the communication module (e.g., the second communication module 490 of FIG. 4) of the HMD device to share the first video.

Referring to FIG. 8B, the electronic device (e.g., the electronic device 301 of FIG. 2A and/or the electronic device 301 of FIG. 3) may receive the first video from the HMD device (e.g., the HMD device 401 of FIG. 2B and/or the HMD device 401 of FIG. 4), and store the first video.

As indicated by <850>, upon identifying selection of playback of the first video, the electronic device may play back the video while displaying the first window 811 and the second window 713 on the display (e.g., the first display 360 of FIG. 3) of the electronic device, as illustrated in (d1).

The electronic device may play back the first video, while displaying the second window 813 focused during the execution of the screen recording function in an expanded size and the first window 811 unfocused during the execution of the screen recording function in a reduced size out of the first window 811 and the second window 813, as illustrated in (d2).

The electronic device may play the first video, while displaying the first window 811 focused during the execution of the screen recording function in an expanded size and the second window 813 unfocused during the execution of the screen recording function in a reduced size out of the first window 811 and the second window 813, as illustrated in (d3).

The electronic device may play the first video, while displaying the first window 811 focused during the execution of the screen recording function in an expanded size and the second window 813 unfocused during the execution of the screen recording function in a reduced size out of the first window 811 and the second window 813, as illustrated in (d4).

As indicated by <870>, upon identifying selection of playback of the first video, the electronic device may play back the video while displaying the first window 811 and the second window 713 on the display (e.g., the first display 360 of FIG. 3) of the electronic device, as illustrated in (e1).

The electronic device may play back the first video, while displaying the second window 813 focused during the execution of the screen recording function in full screen, as illustrated in (e2).

The electronic device may play back the first video, while displaying only the first window 811 focused during the execution of the screen recording function in full screen, as illustrated in (e3).

The electronic device may play back the first video, while displaying the first window 811 focused during the execution of the screen recording function in full screen, as illustrated in (e4).

Figure 9A:
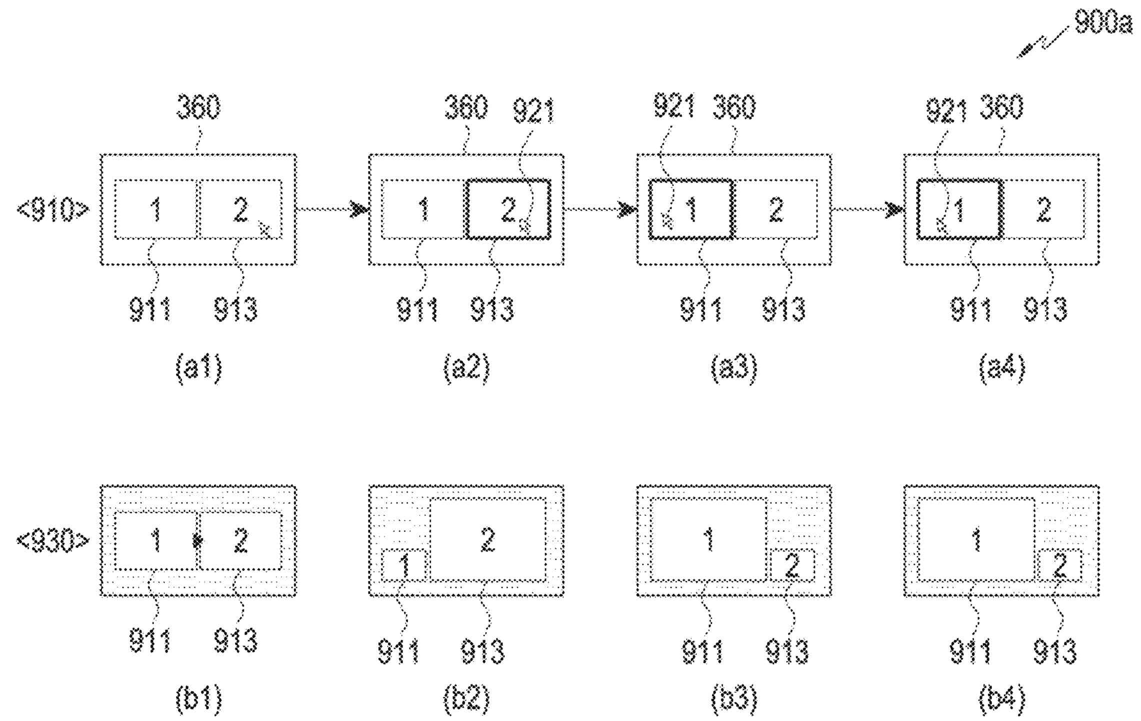
FIGS. 9A and 9B are diagrams illustrating an operation of playing back a video stored in an electronic device on an HMD device according to an embodiment.
Figure 9B:
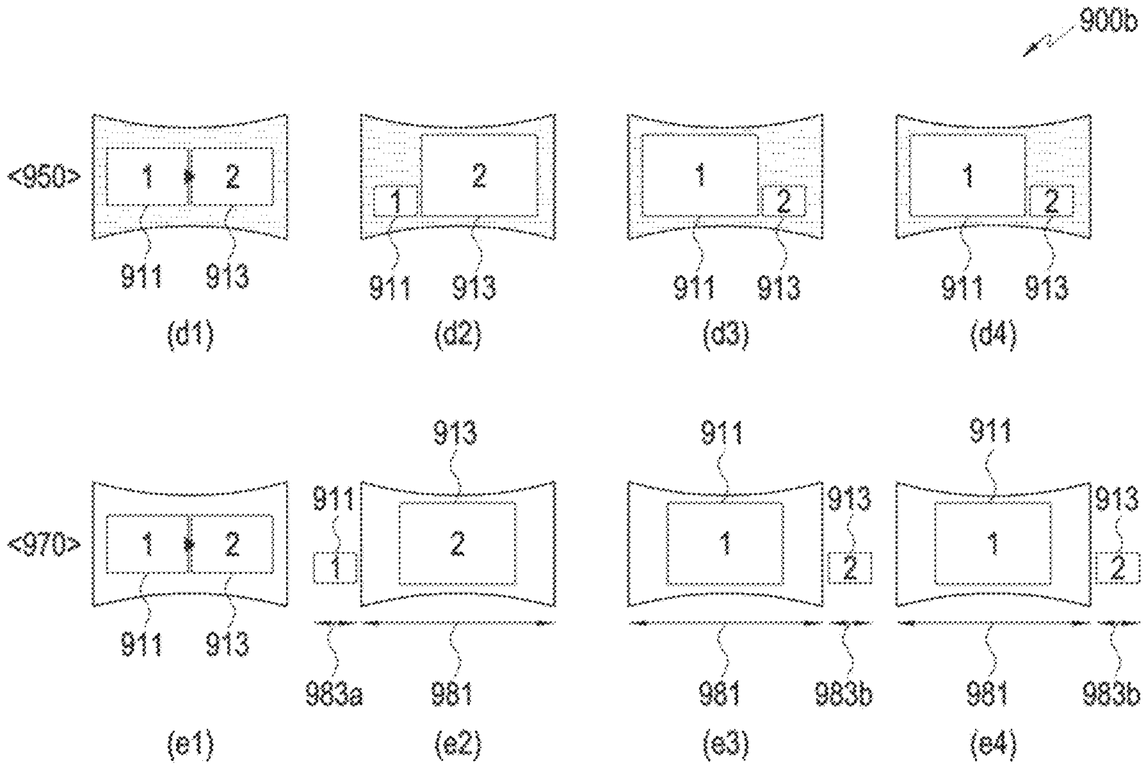

FIGS. 9A and 9B are diagrams 900*a* and 900*b* illustrating an operation of playing back a video stored in an electronic device on an HMD device according to an embodiment.

Referring to FIG. 9A, <910> represents a screen of a display displaying a plurality of windows in an electronic device, and <930> represents a process of recording the screen of the display displaying the plurality of windows in the electronic device.

Upon identifying selection of the screen recording function while displaying a first window 911 displaying execution of a first application and a second window 913 displaying execution of a second application on a screen of the display 360 (e.g., the first display 360 of FIG. 3) of the electronic device (e.g., the electronic device 301 of FIG. 2A and/or the electronic device of FIG. 3), the electronic device may perform the recording function for the screen of the display 360 displaying the first window 911 and the second window 913. While displaying the first window 911 and the second window 913 on the screen of the display 360 as illustrated in (a1), the electronic device may record the screen of the display 360 displaying the first window 911 and the second window 913, as illustrated in (b1).

When a cursor 921 displayed to control the electronic device through an external device (e.g., a mouse) connected to the electronic device is located on the second window 913 during the screen recording function, as illustrated in (a2), the electronic device may detect the second window 913 as a focused window, and record the screen of the display 360 by reducing the size of the unfocused first window 911 and expanding the size of the focused second window 913, as illustrated in (b2).

When the cursor 921 displayed to control the electronic device through an external device (e.g., a mouse) connected to the electronic device is located on the first window 911 during the screen recording function, as illustrated in (a3), the electronic device may detect the first window 911 as a focused window, and record the screen of the display 360 by reducing the size of the unfocused second window 913 and expanding the size of the focused first window 911, as illustrated in (b3).

When the cursor 921 displayed to control the electronic device through the external device (e.g., a mouse) connected to the electronic device is located on the first window 911 during the screen recording function, as illustrated in (a3), the electronic device may detect the first window 911 as a focused window, and record the screen of the display 360 by reducing the size of the unfocused second window 913 and expanding the size of the focused first window 911, as illustrated in (b4).

Upon identifying termination of the screen recording function, the electronic device may store a first video in which the focused window and the unfocused window out of the first window 911 and the second window 913 are distinguishably recorded, in the memory (e.g., the first memory 330 of FIG. 3) of the electronic device.

The electronic device may transmit the first video to a HMD device (e.g., the HMD device 401 of FIG. 2B and/or the HMD device of FIG. 4) through the communication module (e.g., the first communication module 390 of FIG. 3) of the electronic device to share the first video.

Referring to FIG. 9B, the HMD device (e.g., the HMD device 401 of FIG. 2B and/or the HMD device of FIG. 4) may receive the first video from the electronic device (e.g., the electronic device 301 of FIG. 2A and/or the electronic device 301 of FIG. 3), and store the first video.

As indicated by <950>, upon identifying selection of playback of the first video, the HMD device may play back the first video while displaying the first window 911 and the second window 913 on the display (e.g., the second display 460 of FIG. 4) of the HMD device, as illustrated in (d1).

The HMD device may play back the first video, while displaying the second window 913 focused during the execution of the screen recording function in an expanded size and the first window 911 unfocused during the execution of the screen recording function in a reduced size out of the first window 911 and the second window 913, as illustrated in (d2).

The HMD device may play back the first video, while displaying the first window 911 focused during the execution of the screen recording function in an expanded size and the second window 913 unfocused during the execution of the screen recording function in a reduced size out of the first window 911 and the second window 913, as illustrated in (d3).

The HMD device may play the first video, while displaying the first window 911 focused during the execution of the screen recording function in an expanded size and the second window 913 unfocused during the execution of the screen recording function in a reduced size out of the first window 911 and the second window 913, as illustrated in (d4).

As indicated by <970>, upon identifying selection of playback of the first video, the HMD device may play back the first video while displaying the first window 911 and the second window 913 on the display (e.g., the second display 460 of FIG. 4) of the HMD device, as illustrated in (e1).

While playing back the first video, the HMD device may display the second window 913 focused during the execution of the screen recording function within a field of view (FOV) 981 of the user wearing the HMD device and the first window 911 unfocused during the execution of the screen recording function in a peripheral area 983*a* of the FOV of the user out of the first window 911 and the second window 913, as illustrated in (e2).

While playing back the first video, the HMD device may display the first window 911 focused during the execution of the screen recording function within the FOV 981 of the user wearing the HMD device and the second window 913 unfocused during the execution of the screen recording function in a peripheral area 983*b* of the FOV of the user out of the first window 911 and the second window 913, as illustrated in (e3).

While playing the first video, the HMD device may display the first window 911 focused during the execution of the screen recording function within the FOV 981 of the user wearing the HMD device and the second window 913 unfocused during the execution of the screen recording function in the peripheral area 983*b* of the FOV of the user out of the first window 911 and the second window 913, as illustrated in (e4).

Figure 10A:
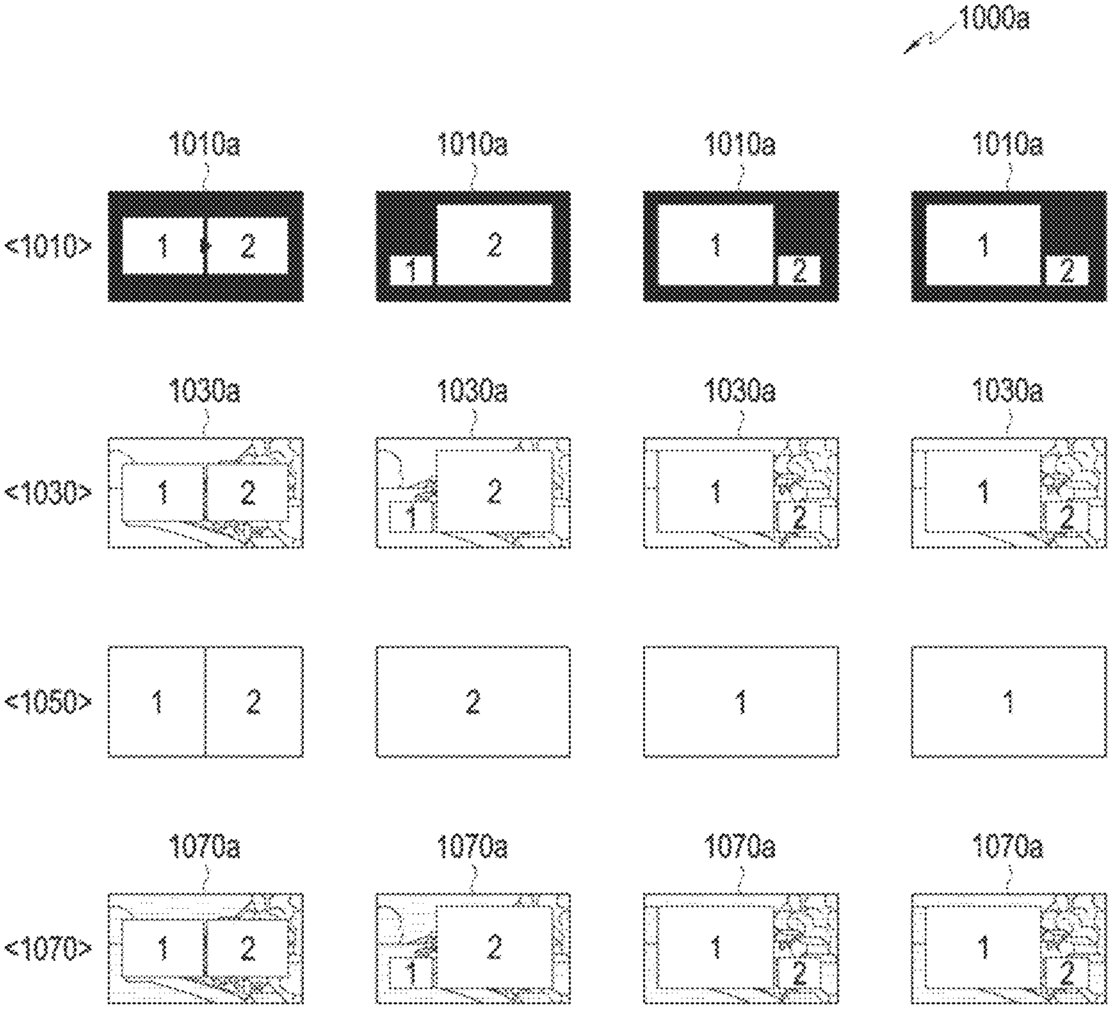
FIGS. 10A and 10B are diagrams illustrating an operation of recording a screen in an electronic device and/or an HMD device according to an embodiment.
Figure 10B:
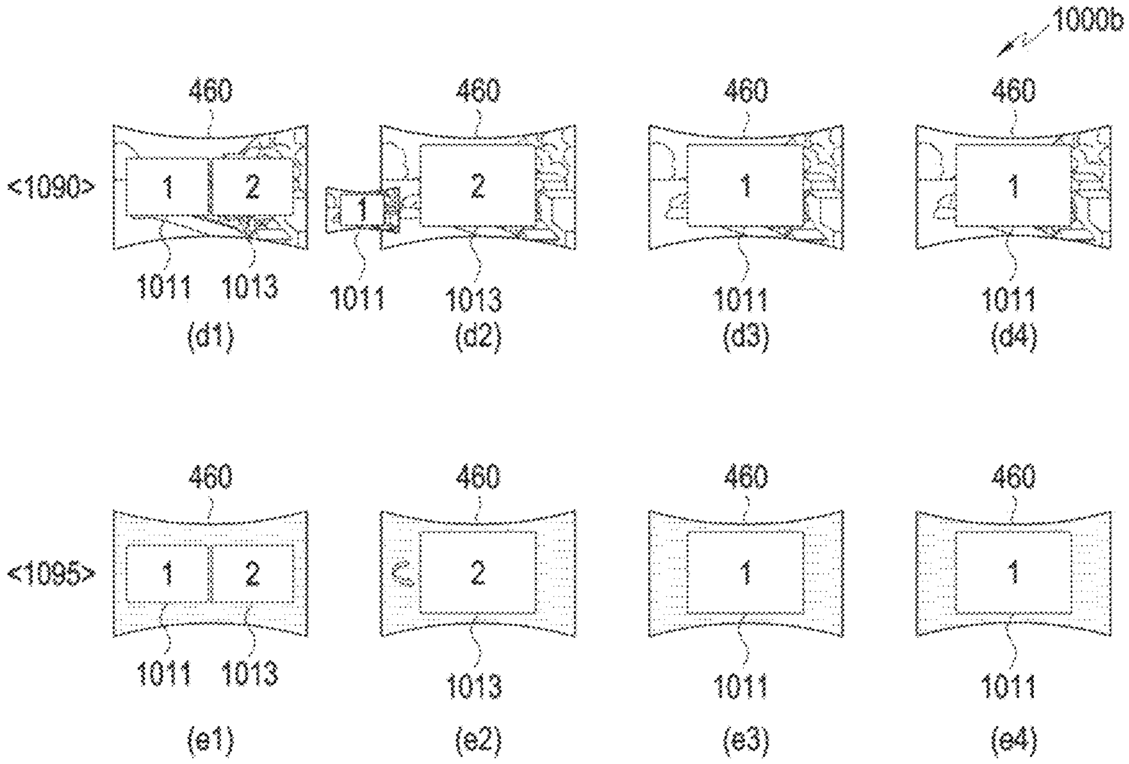

FIGS. 10A and 10B are diagrams 1000*a* and 1000*b* illustrating a screen recording operation in an electronic device and/or an HMD device according to an embodiment.

Referring to FIG. 10A, as indicated by <1010>, while performing the recording function for a screen of the display of the electronic device (e.g., the electronic device 301 of FIG. 2A and/or the electronic device 301 of FIG. 3) and/or the HMD device (e.g., the HMD device 401 and/or the HMD device 401 of FIG. 4), which displays a plurality of windows displaying execution of a plurality of applications, respectively based on selection of the screen recording function, the electronic device and/or the HMD device may perform the recording by blacking a background screen 1010*a* displayed as the background of the plurality of windows.

As indicated by <1030>, while performing the recording function for the screen of the display of the electronic device and/or the HMD device, which displays the plurality of windows displaying execution of the plurality of applications, respectively based on selection of the screen recording function, the electronic device and/or the HMD device may perform the recording by dimming a background screen 1030*a* displayed as the background of the plurality of windows.

As indicated by <1050>, while performing the recording function for the screen of the display of the electronic device and/or the HMD device, which displays the plurality of windows displaying execution of the plurality of applications, respectively based on selection of the screen recording function, the electronic device and/or the HMD device may perform the recording such that a plurality of unfocused windows are displayed in full screen at the same ratio without a background screen displayed as a background of the plurality of windows, or only a focused window among the plurality of windows is displayed in full screen.

As indicated by <1070>, while performing the recording function for the screen of the display of the electronic device and/or the HMD device, which displays the plurality of windows displaying execution of the plurality of applications, respectively based on selection of the screen recording function, the electronic device and/or the HMD device may perform the recording by blurring a background screen 1070*a* displayed as the background of the plurality of windows.

Referring to FIG. 10B, as indicated by <1090>, upon identifying selection of playback of a first video recorded and stored by the screen recording function such that a focused window and an unfocused window out of a first window 1011 and a second window 1013 displayed on the screen of the display 460 (e.g., the second display 460 of FIG. 4) are distinguishable, the HMD device (e.g., the HMD device 401 of FIG. 2B and/or the HMD device 401 of FIG.

4) may perform the recording while displaying the first window 1011 and the second widow 1013 on the screen of the display 460, as illustrated in (d1).

While playing back the first video, the HMD device may display the next focused second window 1013 on a certain area of the first window 1011 for N seconds, while displaying only the focused first window 1011 out of the first window 1011 and the second window 1013 on the display 460, as illustrated in (d2), and then display only the first window 1011 on the display 460, as illustrated in (d3). During the playback of the first video, when the next focused window is the first window 1011, the HMD device may maintain the focused first window 1011 to be displayed on the display 460, as illustrated in (d4).

As indicated by <1095>, upon identifying selection of playback of the first video recorded and stored by the screen recording function such that the focused window and the unfocused window out of the first window 1011 and the second window 1013 displayed on the screen of the display 460 (e.g., the second display 460 of FIG. 4) are distinguishable, the HMD device (e.g., the HMD device 401 of FIG. 2B and/or the HMD device of FIG. 4) may perform the recording while displaying the first window 1011 and the second window 1013 on the screen of the display 460, as illustrated in (e1).

During the playback of the first video, when the next focused window is the second window 1013 while displaying only the focused window 1011 out of the first window 1011 and the second window 1013 on the display 460, as illustrated in (e2), the HMD device may display only the first window on the display 460 with the effect of switching between the first window 1011 and the second window 1033 along the z axis, as illustrated in (e3). During the playback of the first video, when the next focused window is the first window 1011, the HMD device may maintain the focused first window 1011 to be displayed on the display 460, as illustrated in (e4).

Figure 11:
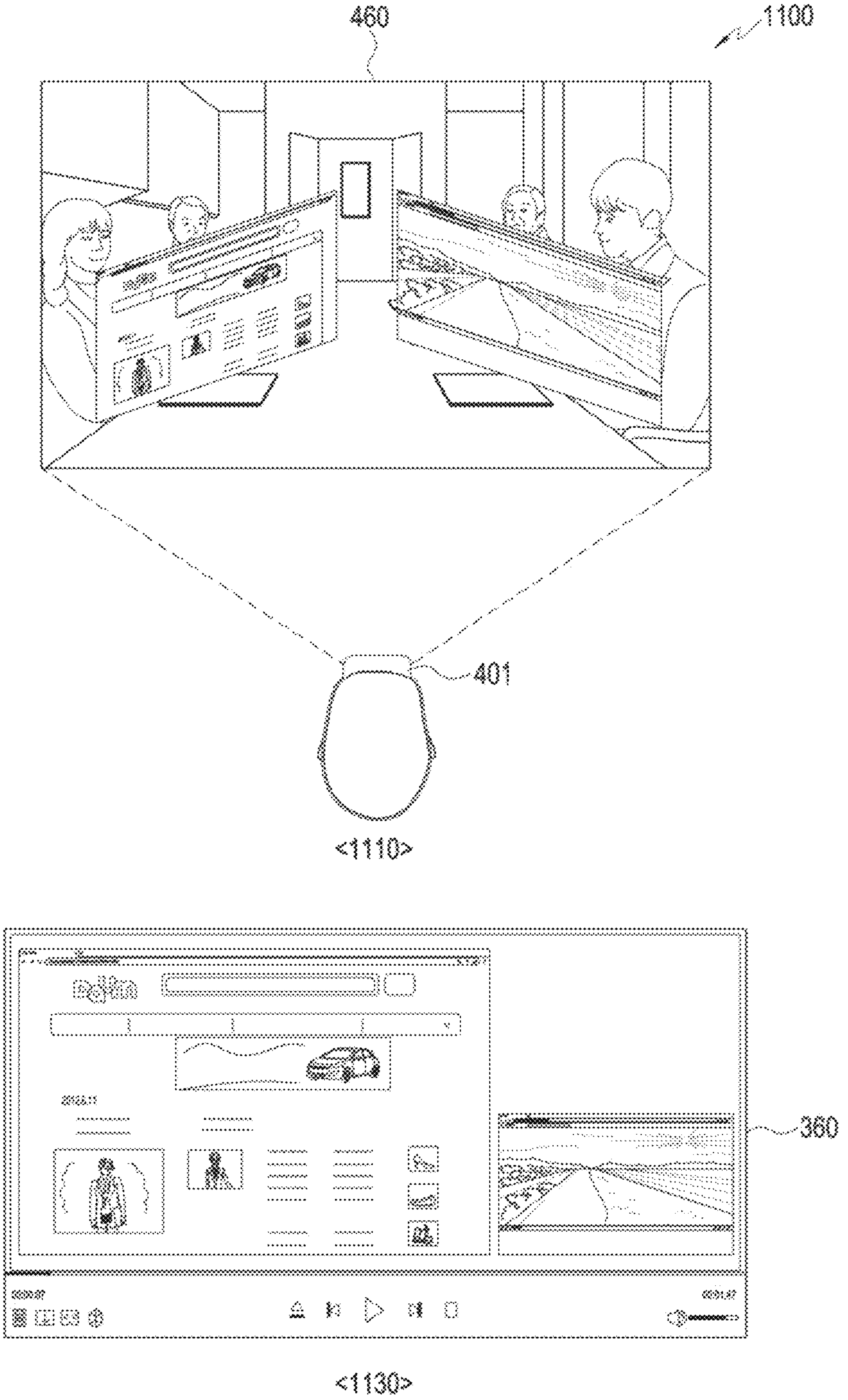
FIG. 11 is a diagram illustrating an operation of playing back a video stored in an HMD on an electronic device according to an embodiment.

FIG. 11 is a diagram 1100 illustrating an operation of playing back a video stored in an HMD on an electronic device according to an embodiment.

Referring to FIG. 11, as illustrated in <1110>, while recording a focused window and an unfocused window distinguishably among a plurality of windows displaying execution of a plurality of applications in a VR space on the display 460 (e.g., the first display 460 of FIG. 4) of the HMD device (e.g., the HMD device 401 of FIG. 2B and/or the HMD device 401 of FIG. 4) based on execution of the screen recording function, the HMD device may also record the VR space displayed as a background of the plurality of windows. Upon identifying termination of the screen recording function, the HMD device may store a first video in which the focused window and the unfocused window are recorded distinguishably among the plurality of windows, together with the VR space, in the memory of the HMD device.

As illustrated in <1130>, the electronic device (e.g., the electronic device 301 of FIG. 2A and/or the electronic device 301 of FIG. 3) and/or the HMD device (e.g., the HMD device 401 of FIG. 2B and/or the HMD device 401 of FIG. 4) may receive and store the first video from the HMD device, and upon identifying selection of playback of the first video, may play back the first video while displaying the VR space as a background image and displaying the focused window in an expanded size and the unfocused window in a reduced size among the plurality of windows on the display 360 (e.g., the first display 360 of FIG. 3) of the electronic device.

Figure 12:
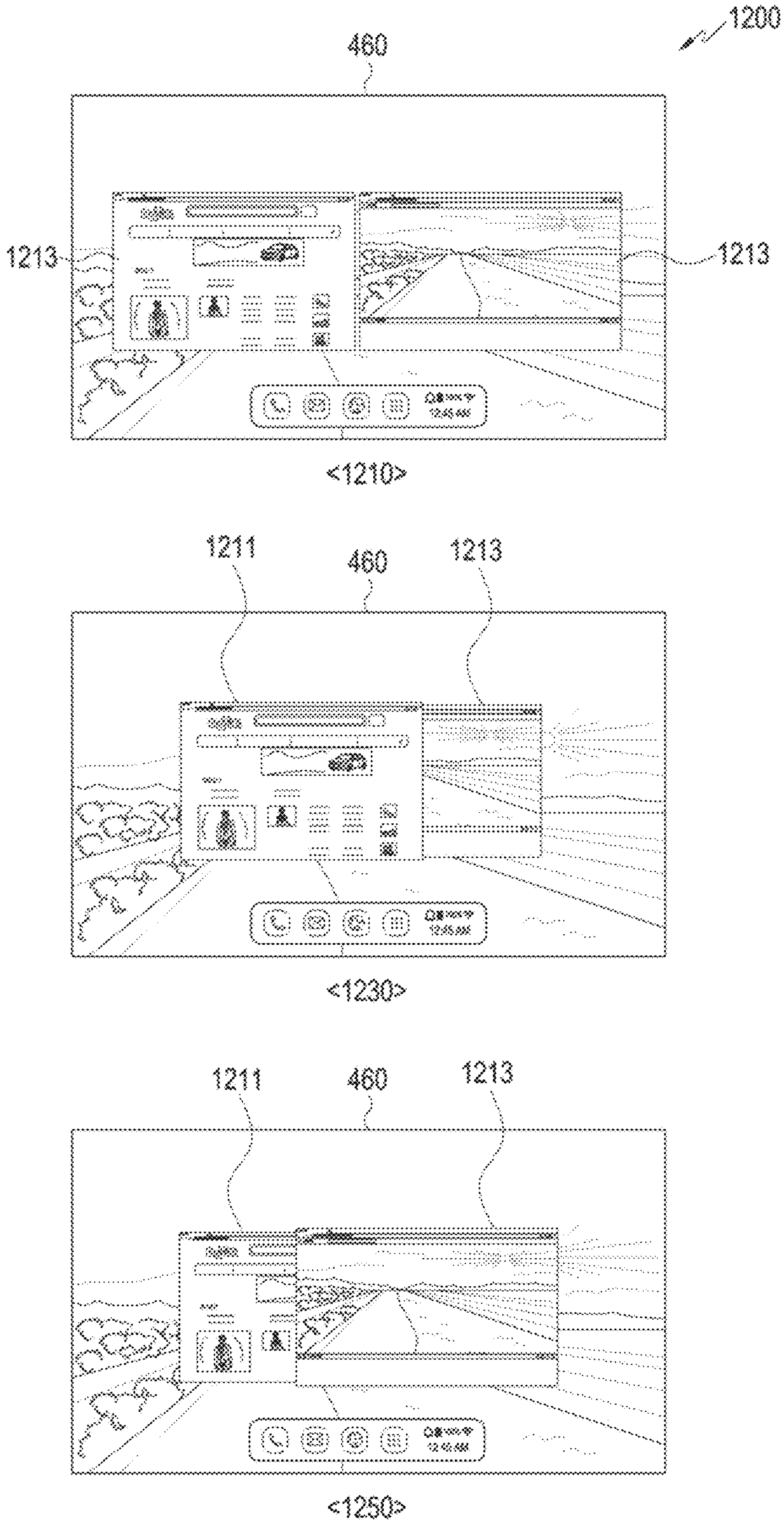
FIG. 12 is a diagram illustrating an operation of controlling a window in an HMD device according to an embodiment.

FIG. 12 is a diagram 1200 illustrating an operation of controlling a window in an HMD device according to an embodiment.

Referring to FIG. 12, while displaying a first window 1211 displaying execution of a first application and a second window 1213 displaying execution of a second application side by side without overlapping in a VR space on the display 460 (e.g., the first display 460 of FIG. 4) of the HMD device (e.g., the HMD device 401 of FIG. 2B and/or the HMD device 401 of FIG. 4, as illustrated in <1210>, the HMD device may change the position of the first window 1211 to the foreground and the second window 1213 to the background and display them by partially overlapping them through a controller communication-connected to the HMD device, a user's hand motion, or a user's eye tracking, as illustrated in <1230>.

While displaying the first window 1211 and the second window 1213 partially overlapping each other by changing the position of the first window 1211 to the foreground and the second window 1213 to the background on the display of the HMD device, as illustrated in <1230>, the HMD device may display the first window 1211 and the second window 1213 partially overlapping each other by changing the position of the second window 1213 to the foreground and the first window 1211 to the background through the controller communication-connected to the HMD device, the user's hand motion, or the user's eye tracking, as illustrated in <1250>.

Figure 13:
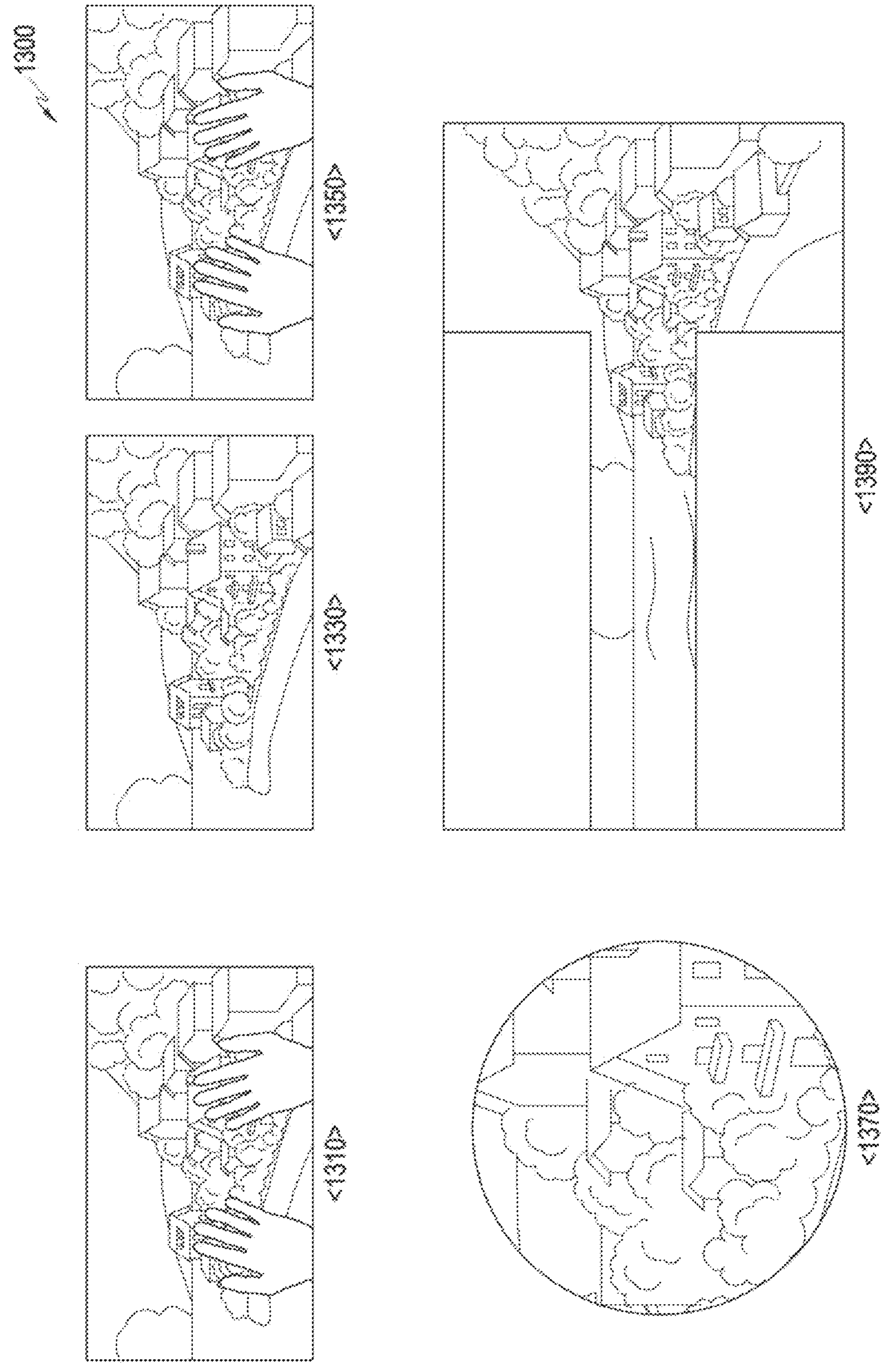
FIG. 13 is a diagram illustrating an operation of storing a three-dimensional space in an HMD device according to an embodiment.

FIG. 13 is a diagram 1300 illustrating an operation of storing a three-dimensional space in an HMD device according to an embodiment.

Referring to FIG. 13, upon identifying selection of a screen capture function while displaying a user's hand in a VR space, as illustrated in <1310>, the HMD device (e.g., the HMD device 401 of FIG. 2B and/or the HMD device 401 of FIG. 4) may capture the VR space excluding the user's hand and store it as an image, as illustrated in <1330>, or capture the VR space including the user's hand and store it as an image, as illustrated in <1350>.

The HMD device may store the captured VR space in a sphere shape, as illustrated in <1370>, or store the captured VR space in a hexahedron, as illustrated in <1390>.

Figure 14A:
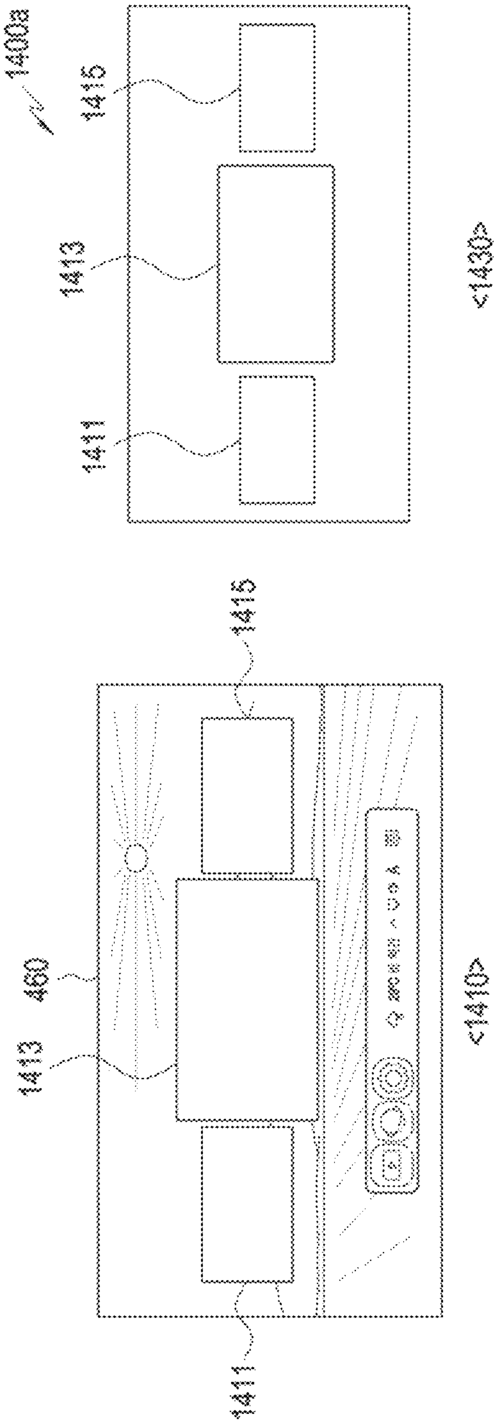
FIGS. 14A and 14B are diagrams illustrating an operation of a screen recording function in an HMD device according to an embodiment.
Figure 14B:
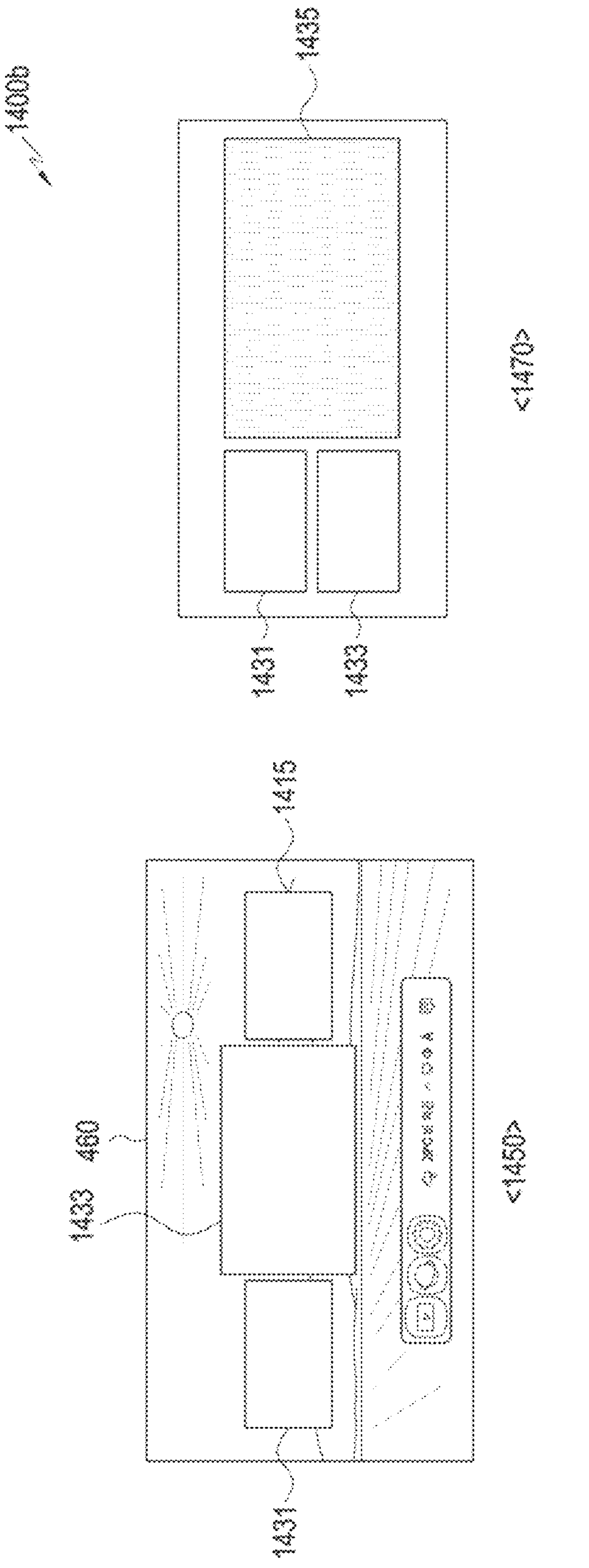

FIGS. 14A and 14B are diagrams 1400*a* and 1400*b* illustrating an operation of a screen recording function in a HMD device according to an embodiment.

Referring to FIG. 14A, upon identifying selection of the screen recording function while displaying a first window 1411 displaying execution of a first application, a second window 1413 displaying execution of a second application, and a third window 1415 displaying execution of a third application on the display 460 (e.g., the second display 460 of FIG. 4) of the HMD device (e.g., the HMD device 401 of FIG. 2B and/or the HMD device 401 of FIG. 4), when the user's gaze lingers on the second window 1413 through the user's gaze tracking as illustrated in <1410>, the HMD device may display the second window 1413 in an expanded size at the center of the display 460, and display the first window 1411 and the third window 1415 in reduced sizes on both sides of the second window 1413. The HMD device may perform the screen recording such that the second window 1413 is displayed in an expanded size at the center and the first window 1411 and the third window 1415 are displayed in reduced sizes on both sides of the second window 1413 as illustrated in <1430> according to the layout of the plurality of windows indicated by <1410>.

Referring to FIG. 14B, upon identifying selection of the screen recording function while displaying a first window

1431 displaying execution of a first application, a second window 1433 displaying execution of a second application, and a third window 1435 displaying execution of a third application on the display 460 (e.g., the first display 360 of FIG. 3) of the HMD device (e.g., the HMD device 401 of FIG. 2B and/or the HMD device 401 of FIG. 4), when the user's gaze lingers on the second window 1433 through the user's gaze tracking, the HMD device may display the second window 1433 in an expanded size as the foreground at the center and display the first window 1431 and the third window 1435 in reduced sizes as the background, so that the second window 1433 partially overlaps the first window 1431 and the third window 1435, as illustrated in <1450>. The HMD device may perform the screen recording such that the first window 1431 and the third window 1435 are displayed in reduced sizes on the left side, and the second window 1433 is displayed in an expanded size on the right side according to the layout of plurality of windows indicated by <1450>, as illustrated in <1470>.

Figure 15A:
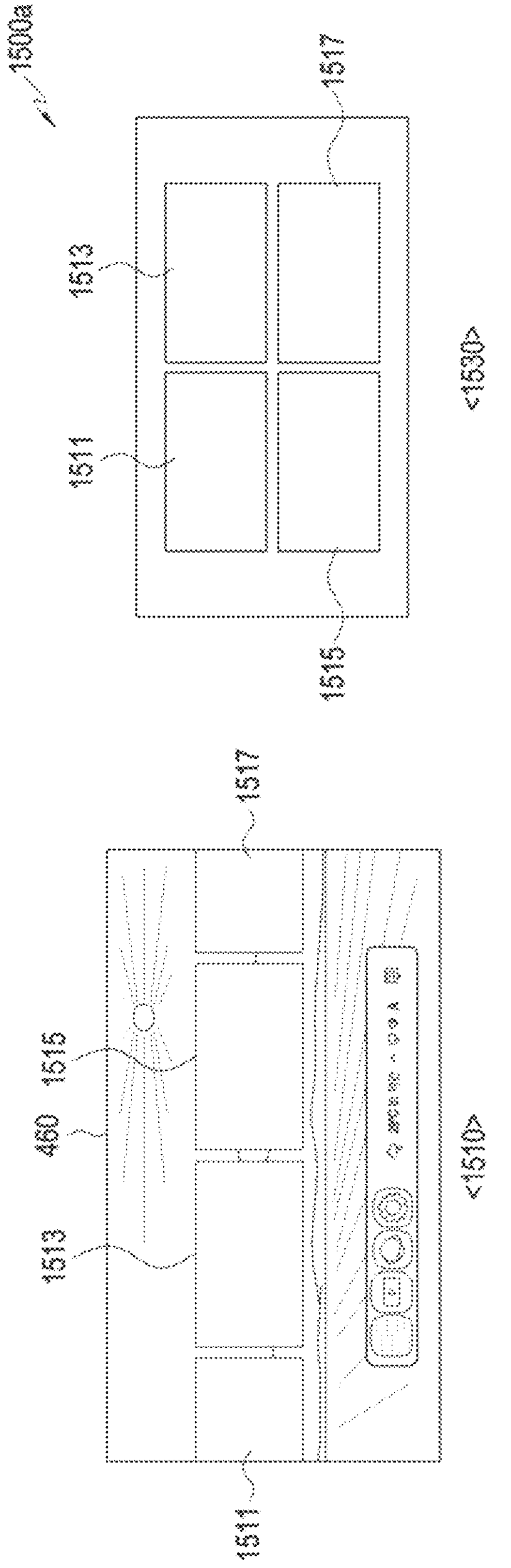
FIGS. 15A and 15B are diagrams illustrating an operation of a screen recording function in an HMD device according to an embodiment.
Figure 15B:
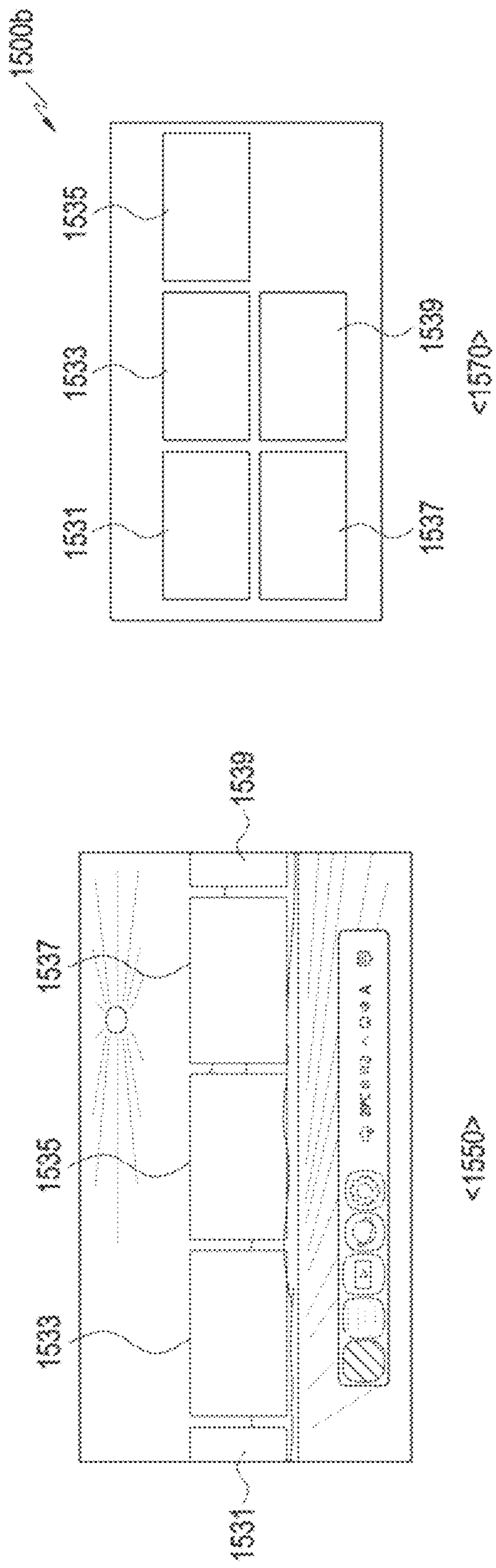

FIGS. 15A and 15B are diagrams 1500*a* and 1500*b* illustrating an operation of a screen recording function in a HMD device according to an embodiment.

Referring to FIG. 15A, while displaying a first window 1511 displaying execution of a first application, a second window 1513 displaying execution of a second application, a third window 1515 displaying execution of a third application, and a fourth window 1517 displaying execution of a fourth application on the display 460 (e.g., the second display 460 of FIG. 4) of the HMD device (e.g., the HMD device 401 of FIG. 2B and/or the HMD device 401 of FIG. 4), as illustrated in <1510>, the HMD device may identify selection of the screen recording function. When the four windows 1511, 1513, 1515, and 1517 are used the same number of times during the screen recording function, the HMD device may perform the screen recording in a grid view format, as illustrated in <1530>.

Referring to FIG. 15B, while displaying a first window 1531 displaying execution of a first application, a second window 1533 displaying execution of a second application, a third window 1535 displaying execution of a third application, a fourth window 1537 displaying execution of a fourth application, and a fifth window 1539 displaying execution of a fourth application on the display 460 (e.g., the second display 460 of FIG. 4) of the HMD device (e.g., the HMD device 401 of FIG. 2B and/or the HMD device 401 of FIG. 4), as illustrated in <1550>, the HMD device may identify selection of the screen recording function. When the five windows 1531, 1533, 1535, 1537, and 1539 are used the same number of times during the screen recording function, the HMD device may perform the screen recording in a grid view format, as illustrated in <1570>.

According to an embodiment, an electronic device (101 of FIG. 1, 301 of FIG. 2A, or 301 of FIG. 3) may include memory (130 of FIG. 1 or 330 of FIG. 3), a display (160 of FIG. 1 or 360 of FIG. 3), and a processor (120 of FIG. 1 or 320 of FIG. 3).

According to an embodiment, upon identifying selection of a screen recording function while displaying a plurality of windows displaying execution of a plurality of applications, respectively on a screen of the display, the processor (120 of FIG. 1 or 320 of FIG. 3) may perform the recording function for the screen of the display displaying the plurality of windows.

According to an embodiment, upon detection of a focused window among the plurality of windows while performing the recording function for the screen, the processor (120 of FIG. 1 or 320 of FIG. 3) may record the focused window and an unfocused window distinguishably.

According to an embodiment, upon identifying termination of the screen recording function, the processor (120 of FIG. 1 or 320 of FIG. 3) may store a video in which the focused window and the unfocused window among the plurality of windows are recorded distinguishably in the memory.

According to an embodiment, the processor (120 of FIG. 1 or 320 of FIG. 3) may detect, as the focused window, at least one of a window activated and in use by a user's selection, a window on which a cursor displayed to control the electronic device through an external device connected to the electronic device is located, or a window on which the user's gaze lingers, among the plurality of windows.

According to an embodiment, the processor (120 of FIG. 1 or 320 of FIG. 3) may record a background image displayed as a background of the plurality of windows, while distinguishably recording the focused window and the unfocused window among the plurality of windows.

According to an embodiment, the processor (120 of FIG. 1 or 320 of FIG. 3) may record by expanding a size of the focused window and reducing a size of the unfocused window among the plurality of windows.

According to an embodiment, the processor (120 of FIG. 1 or 320 of FIG. 3) may record, while displaying the focused window on the screen of the display without displaying the unfocused window among the plurality of windows.

According to an embodiment, upon identifying selection of screen capture while displaying the plurality of windows on the screen of the display, the processor (120 of FIG. 1 or 320 of FIG. 3) may detect the focused window among the plurality of windows and store the focused window and the unfocused window distinguishably as an image.

According to an embodiment, the processor (120 of FIG. 1 or 320 of FIG. 3) may store an image in which the size of the focused window is expanded and the size of the unfocused window is reduced among the plurality of windows.

According to an embodiment, the processor (120 of FIG. 1 or 320 of FIG. 3) may store an image in which the focused window is displayed on the screen of the display without displaying the unfocused window among the plurality of windows.

According to an embodiment, when the electronic device comprises an HMD device (401 of FIG. 2B; 401 of FIG. 4), while performing the screen recording function for a display (e.g., 460 of FIG. 4) displaying a plurality of windows in a three-dimensional space according to selection of the screen recording function, a processor (120 of FIG. 1 or 420 of FIG. 4) may perform the screen recording function, while detecting, as a focused window, at least one of a window selected by a controller communication-connected to the electronic device, a window selected by the user's hand motion, or a window on which the user's gaze lingers among the plurality of windows.

According to an embodiment, the processor (120 of FIG. 1 or 420 of FIG. 4) may record a three-dimensional space displayed as a background of the plurality of windows as a background image, while recording the focused window and the unfocused window distinguishably among the plurality of windows.

Figure 16:
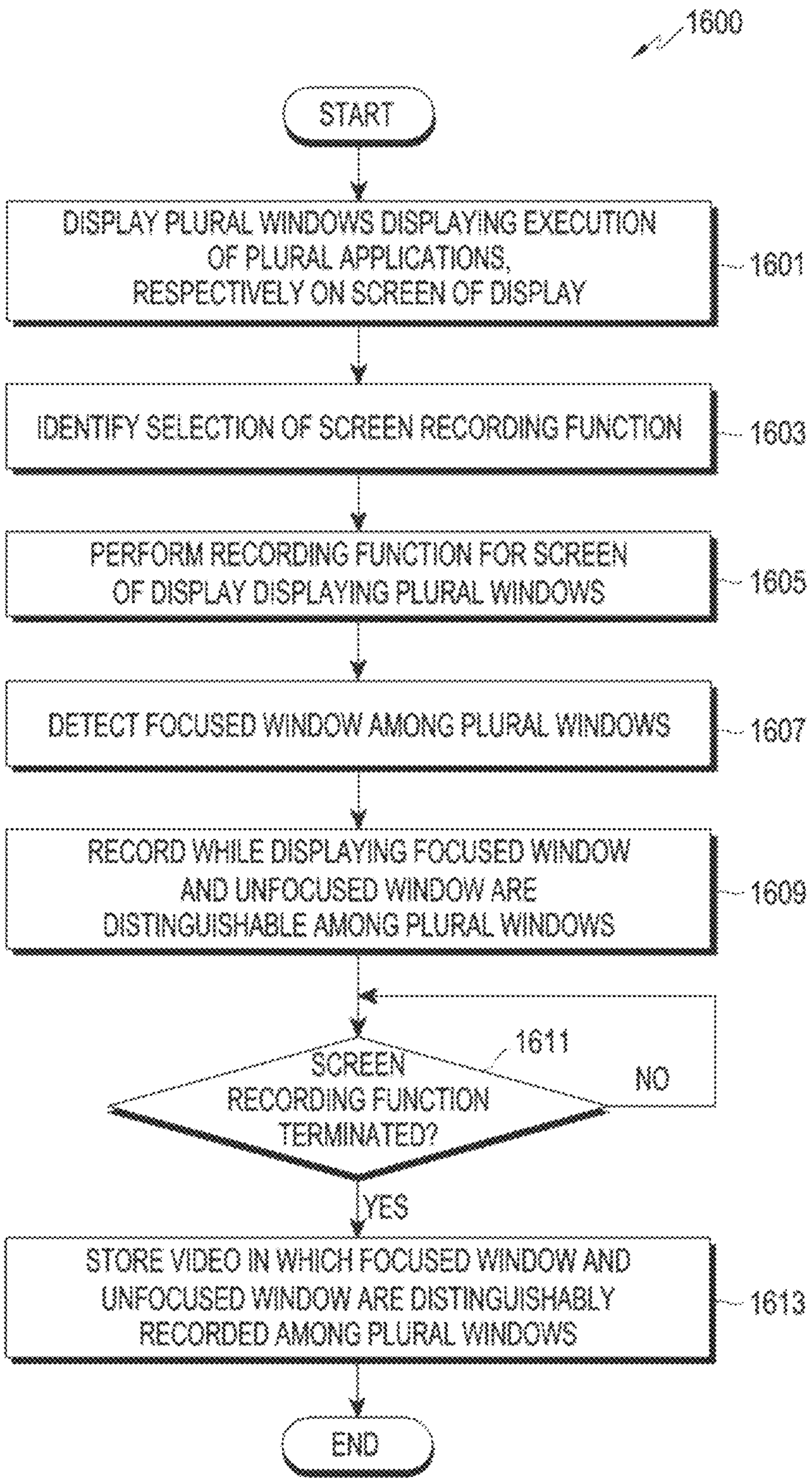
FIG. 16 is a flowchart illustrating an operation of controlling a screen of a display in an electronic device according to an embodiment.

FIG. 16 is a flowchart 1600 illustrating an operation of controlling a screen of a display in an electronic device according to an embodiment. The operation of controlling the screen of the display may include operations 1601 to 1613. In the following embodiment, each operation may be performed sequentially, but not necessarily. For example, the order of the operations may be changed, at least two operations may be performed in parallel, or another operation may be added.

In operation 1601, an electronic device (e.g., the electronic device 301 of FIG. 2A and the electronic device 301 of FIG. 3) may display a plurality of windows displaying execution of a plurality of applications, respectively on a screen of a display.

According to an embodiment, the electronic device may display a plurality of windows displaying execution of a plurality of applications selected by a user, respectively on the display (e.g., the first display 360 of FIG. 3) of the electronic device.

In operation 1603, the electronic device (e.g., the electronic device 301 of FIG. 2A and the electronic device 301 of FIG. 3) may identify selection of a screen recording function.

In operation 1605, the electronic device (e.g., the electronic device 301 of FIG. 2A and the electronic device 301 of FIG. 3) may perform the recording function for the screen of the display displaying the plurality of windows.

According to an embodiment, upon identifying selection of the screen recording function while displaying the plurality of windows on the screen of the display (e.g., the first display 360 of FIG. 3) of the electronic device, the electronic device may perform the recording function for the screen of the display displaying the plurality of windows.

In operation 1607, the electronic device (e.g., the electronic device 301 of FIG. 2A and the electronic device 301 of FIG. 3) may detect a focused window among the plurality of windows.

According to an embodiment, the electronic device may detect, as the focused window, at least one of a window activated and in use by a user's selection, a window on which a cursor displayed to control the electronic device through an external device connected to the electronic device is located, or a window on which the user's gaze lingers among the plurality of windows.

In operation 1609, the electronic device (e.g., the electronic device 301 of FIG. 2A and the electronic device 301 of FIG. 3) may perform the recording such that a focused window and an unfocused window are distinguishable from each other among the plurality of windows.

According to an embodiment, upon detection of a focused window among the plurality of windows while performing the recording function for the screen of the display (e.g., the first display 360 of FIG. 3) of the electronic device, the electronic device may perform the recording by expanding the size of the focused window and reducing the size of an unfocused window.

According to an embodiment, upon detection of a focused window among the plurality of windows while performing the recording function for the screen of the display (e.g., the first display 360 of FIG. 3) of the electronic device, the electronic device may perform the recording such that only the focused window is displayed on the screen of the display.

According to an embodiment, while performing the recording function for the screen of the display, the electronic device may record a background image displayed as a background of the plurality of windows, together with the plurality of windows.

According to an embodiment, while performing the recording function for the screen of the display, the electronic device may record the background image displayed as the background of the plurality of windows by blacking, dimming, or blurring the background image based on the user's selection, together with the plurality of windows.

In operation 1611, the electronic device (e.g., the electronic device 301 of FIG. 2A and the electronic device 301 of FIG. 3) may identify selection of termination of the screen recording function.

In operation 1613, the electronic device (e.g., the electronic device 301 of FIG. 2A and the electronic device 301 of FIG. 3) may store a video in which the focused window and the unfocused window are distinguishably recorded among the plurality of windows.

According to an embodiment, the electronic device may store the video in which the focused window and the unfocused window are distinguishably recorded among the plurality of windows in memory (e.g., the first memory 330 of FIG. 3) of the electronic device.

According to an embodiment, the electronic device may store the video in which the focused window and the unfocused window are recorded distinguishably among the plurality of windows, together with the background image displayed as the background of the plurality of windows in the memory (e.g., the first memory 330 of FIG. 3) of the electronic device.

According to an embodiment, the electronic device may share the video in which the focused window and the unfocused window are distinguishably recorded among the plurality of windows by transmitting the video to an external electronic device (e.g., the HMD device 401 of FIG. 2B and/or the HMD device 401 of FIG. 4) through a communication module (e.g., the first communication module 390 of FIG. 3) of the electronic device.

Figure 17:
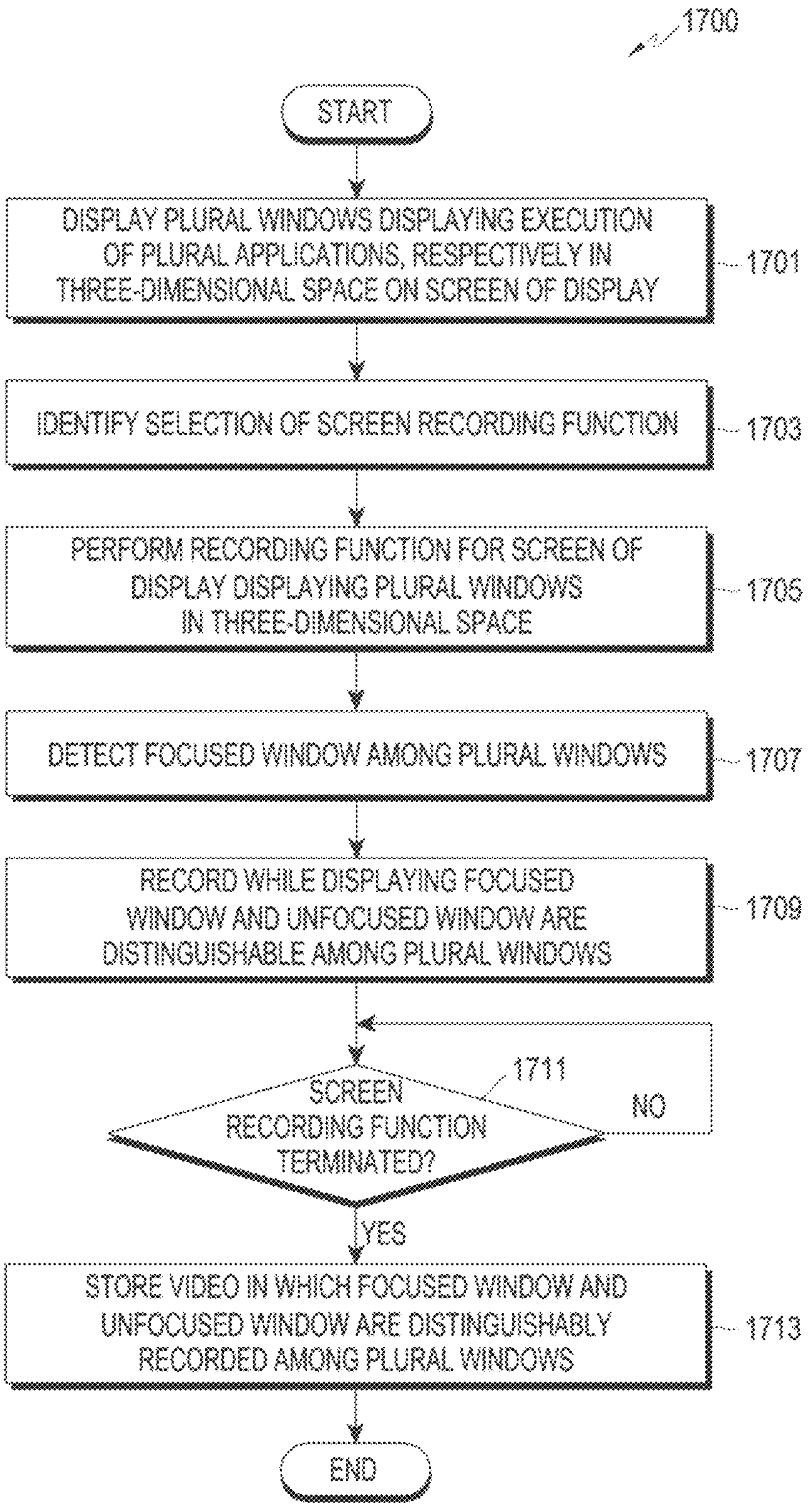
FIG. 17 is a flowchart illustrating an operation of controlling a screen of a display in an HMD device according to an embodiment.

FIG. 17 is a flowchart 1700 illustrating an operation of controlling a screen of a display in an HMD device according to an embodiment. The operation of controlling the screen of the display may include operations 1701 to 1713. In the following embodiment, each operation may be performed sequentially, but not necessarily. For example, the order of the operations may be changed, at least two operations may be performed in parallel, or another operation may be added.

In operation 1701, a HMD device (e.g., the HMD device 401 of FIG. 2B and the HMD device 401 of FIG. 4) may display a plurality of windows displaying execution of a plurality of applications, respectively in a three-dimensional space on a screen of a display.

According to an embodiment, the HMD device may display a plurality of windows displaying execution of a plurality of applications selected by a user, respectively in the three-dimensional space (e.g., a VR space or an AR space) on the screen of the display (e.g., the second display 460 of FIG. 4) of the HMD device.

In operation 1703, the HMD device (e.g., the HMD device 401 of FIG. 2B and the HMD device 401 of FIG. 4) may identify selection of a screen recording function.

In operation 1705, the HMD device (e.g., the HMD device 401 of FIG. 2B and the HMD device 401 of FIG. 4) may perform the recording function for the screen of the display displaying the plurality of windows in the three-dimensional space.

According to an embodiment, upon identifying selection of the screen recording function while displaying the plurality of windows on the screen of the display (e.g., the second display 460 of FIG. 4) of the HMD device, the HMD device may perform the recording function for the screen of the display displaying the plurality of windows.

In operation 1707, the HMD device (e.g., the HMD device 401 of FIG. 2B and the HMD device 401 of FIG. 4) may identify whether a focused window is detected among the plurality of windows.

According to an embodiment, while displaying the plurality of windows in the three-dimensional space, the HMD device may detect, as the focused window, at least one of a window selected by a controller communication-connected to the HMD device, a window selected by a user's hand motion, or a window on which the user's gaze lingers among the plurality of windows.

In operation 1709, the HMD device (e.g., the HMD device 401 of FIG. 2B and the HMD device 401 of FIG. 4) may perform the recording while distinguishably displaying a focused window and an unfocused window among the plurality of windows.

According to an embodiment, upon detection of a focused window among the plurality of windows while performing the recording function for the screen of the display (e.g., the second display 460 of FIG. 4) of the HMD device, the HMD device may perform the recording by expanding the size of the focused window and reducing the size of an unfocused window.

According to an embodiment, upon detection of a focused window among the plurality of windows while performing the recording function for the screen of the display (e.g., the second display 460 of FIG. 4) of the HMD device, the HMD device may perform the recording such that only the focused window is displayed on the screen of the display.

According to an embodiment, while performing the recording function for the screen of the display, the HMD device may record the three-dimensional space (e.g., a VR space or an AR space) displayed as a background of the plurality of windows as a background image, together with the plurality of windows.

In operation 1711, the HMD device (e.g., the HMD device 401 of FIG. 2B and the HMD device 401 of FIG. 4) may identify selection of termination of the screen recording function.

In operation 1713, the HMD device (e.g., the HMD device 401 of FIG. 2B and the HMD device 401 of FIG. 4) may store a video in which the focused window and the unfocused window are distinguishably recorded among the plurality of windows.

According to an embodiment, the HMD device may store the video in which the focused window and the unfocused window are distinguishably recorded among the plurality of windows in the memory (e.g., the second memory 430 of FIG. 4) of the HMD device.

According to an embodiment, the HMD device may store the video in which the focused window and the unfocused window are recorded distinguishably among the plurality of windows, together with the background image of the three-dimensional space displayed as the background of the plurality of windows in the memory (e.g., the second memory 430 of FIG. 4) of the HMD device.

According to an embodiment, the HMD device may share the video in which the focused window and the unfocused window are distinguishably recorded among the plurality of windows by transmitting the video to an external electronic device (e.g., the electronic device 301 of FIG. 2A and/or the electronic device 301 of FIG. 3) through the communication module (e.g., the second communication module 490 of FIG. 4) of the HMD device.

According to an embodiment, a method of controlling a screen of a display in an electronic device may include, upon identifying selection of a screen recording function while displaying a plurality of windows displaying execution of a plurality of applications, respectively on a screen of a display of the electronic device, performing the recording function for the screen of the display displaying the plurality of windows.

According to an embodiment, the method may include, upon detection of a focused window among the plurality of windows while performing the recording function for the screen, recording the focused window and an unfocused window distinguishably.

According to an embodiment, the method may include, upon identifying termination of the screen recording function, storing a video in which the focused window and the unfocused window among the plurality of windows are recorded distinguishably in memory of the electronic device.

According to an embodiment, the method may include detecting, as the focused window, at least one of a window activated and in use by a user's selection, a window on which a cursor displayed to control the electronic device through an external device connected to the electronic device is located, or a window on which the user's gaze lingers, among the plurality of windows.

According to an embodiment, the method may include recording a background image displayed as a background of the plurality of windows, while distinguishably recording the focused window and the unfocused window among the plurality of windows.

According to an embodiment, the method may include recording by expanding a size of the focused window and reducing a size of the unfocused window among the plurality of windows.

According to an embodiment, the method may include recording, while displaying the focused window on the screen of the display without displaying the unfocused window among the plurality of windows.

According to an embodiment, the method may include, upon identifying selection of screen capture while displaying the plurality of windows on the screen of the display, detecting the focused window among the plurality of windows.

According to an embodiment, the method may include storing an image in which the focused window and the unfocused window are distinguishable from each other.

According to an embodiment, the method may include storing an image in which the size of the focused window is increased and the size of the unfocused window is reduced among the plurality of windows.

According to an embodiment, the method may include storing an image in which the focused window is displayed on the screen of the display without displaying the unfocused window among the plurality of windows.

According to an embodiment, the method may include, while performing the screen recording function for a display displaying a plurality of windows in a three-dimensional space according to selection of the screen recording function, performing the screen recording function by a processor (120 of FIG. 1 or 420 of FIG. 4) of an HMD device (401 of FIG. 2B or 401 of FIG. 4) capable of sharing the video with the electronic device, while detecting, as a focused window, at least one of a window selected by a controller communication-connected to the electronic device, a window selected by the user's hand motion, or a window on which the user's gaze lingers among the plurality of windows.

According to an embodiment, the method may include recording a three-dimensional space displayed as a background of the plurality of windows as a background image, while recording the focused window and the unfocused window distinguishably among the plurality of windows.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101 or the electronic device 301). For example, a processor (e.g., the processor 520) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment of the disclosure, in a non-volatile storage medium storing instructions, the instructions may be configured to, when executed by an electronic device, enable the electronic device to perform at least one operation. The at least one operation may include, upon identifying selection of a screen recording function while displaying a plurality of windows displaying execution of a plurality of applications, respectively on a screen of a display of the electronic device, performing the recording function for the screen of the display displaying the plurality of windows, upon detection of a focused window among the plurality of windows while performing the recording function for the screen, recording the focused window and an unfocused window distinguishably, and upon identifying termination of the screen recording function, storing a video in which the focused window and the unfocused window among the plurality of windows are recorded distinguishably in memory of the electronic device.

What is claimed is:

1. An electronic device comprising:

a display;

at least one processor; and memory storing instructions that, when executed by the at least one processor individually or collectively, cause the electronic device to:

based on identifying a selection of a screen recording function while displaying execution of a first application in a first window and execution of a second application in a second window on a screen of the display, perform the screen recording function for the screen of the display displaying the first window and the second window;

while performing the screen recording function for the screen, based on detecting that a focus is changed from the first window to the second window;

control the display to maintain a size of the first window and a size of the second window, and record the first window and the second window in a reconfigured layout by reducing the size of the first window and increasing the size of the second window; and based on identifying a termination of the screen recording function, store a video including the first window and the second window whose sizes are changed according to the change of the focus in the memory.

2. The electronic device of claim 1, wherein the instructions, when executed by the at least one processor individually or collectively, cause the electronic device to:

detect, as a focused window, at least one of a window activated and in use by a selection of a user, a window on which a cursor displayed to control the electronic device through an external device connected to the electronic device is located, or a window on which a gaze of the user lingers for a predetermined time, among the first window and the second window.

3. The electronic device of claim 1, wherein the instructions, when executed by the at least one processor individually or collectively, cause the electronic device to:

record a background image displayed as a background of the first window and the second window, while recording the first window and the second window in the reconfigured layout by reducing the size of the first window and increasing the size of the second window.

4. The electronic device of claim 1, wherein the instructions, when executed by the at least one processor individually or collectively, cause the electronic device to:

based on identifying a selection of screen capture while displaying the first window and the second window on the screen of the display, detect the second window as a focused second window, and store the focused second window and an unfocused first window as an image.

5. The electronic device of claim 4, wherein the instructions, when executed by the at least one processor individually or collectively, cause the electronic device to:

store the image in which the size of the focused second window is increased and the size of the unfocused first window is reduced.

6. The electronic device of claim 4, wherein the instructions, when executed by the at least one processor individually or collectively, cause the electronic device to:

store the image in which the focused second window is displayed on the screen of the display and the unfocused first window is not displayed.

7. The electronic device of claim 1, wherein the instructions, when executed by the at least one processor individually or collectively, based on the electronic device including a head mounted display (HMD) device, cause the electronic device to:

while performing the screen recording function for the display displaying the first window and the second window in a three-dimensional space according to a selection of the screen recording function, perform the screen recording function, while detecting, as a focused second window, at least one of a window selected by a controller communicatively connected to the electronic device, a window selected by a hand motion of a user, or a window on which a gaze of the user lingers for a predetermined time.

8. The electronic device of claim 7, wherein the instructions, when executed by the at least one processor individually or collectively, cause the electronic device to:

record the three-dimensional space displayed as a background of the first window and the second window as a background image, while recording the focused second window and an unfocused first window.

9. A method of controlling a screen of a display in an electronic device, the method comprising:

based on identifying a selection of a screen recording function while displaying execution of a first application in a first window and execution of a second application in a second window on the screen of the display, performing the screen recording function for the screen of the display displaying the first window and the second window;

while performing the screen recording function for the screen, based on detecting that a focus is changed from the first window to the second window:

controlling the display to maintain a size of the first window and a size of the second window, and recording the first window and the second window in a reconfigured layout by reducing the size of the first window and increasing the size of the second window; and based on identifying a termination of the screen recording function, storing a video including the first window and the second window whose sizes are changed according to the change of the focus in a memory of the electronic device.

10. The method of claim 9, further comprising detecting, as a focused window, at least one of a window activated and in use by a selection of a user, a window on which a cursor displayed to control the electronic device through an external device connected to the electronic device is located, or a window on which a gaze of the user lingers for a predetermined time, among the first window and the second window.

11. The method of claim 9, further comprising recording a background image displayed as a background of the first window and the second window, while recording the first window and the second window in the reconfigured layout by reducing the size of the first window and increasing the size of the second window.

12. A non-transitory computer-readable storage medium for storing instructions which, when executed by at least one processor of an electronic device individually or collectively, cause the electronic device to perform:

based on identifying a selection of a screen recording function while displaying execution of a first application in a first window and execution of a second application in a second window on a screen of a display of the electronic device, performing the screen recording function for the screen of the display displaying the first window and the second window;

while performing the screen recording function for the screen, based on detecting that a focus is changed from the first window to the second window:

controlling the display to maintain a size of the first window and a size of the second window, and recording the first window and the second window in a reconfigured layout by reducing the size of the first window and increasing the size of the second window; and based on identifying a termination of the screen recording function, storing a video including the first window and the second window whose sizes are changed according to the change of the focus in a memory of the electronic device.

13. The non-transitory computer-readable storage medium of claim 12, wherein the instructions, when executed by the at least one processor individually or collectively, cause the electronic device to perform:

detecting, as a focused window, at least one of a window activated and in use by a selection of a user, a window on which a cursor displayed to control the electronic device through an external device connected to the electronic device is located, or a window on which a gaze of the user lingers for a predetermined time, among the first window and the second window.

14. The non-transitory computer-readable storage medium of claim 12, wherein the instructions, when executed by the at least one processor individually or collectively, cause the electronic device to perform:

recording a background image displayed as a background of the first window and the second window, while recording the first window and the second window in the reconfigured layout by reducing the size of the first window and increasing the size of the second window.

* * * * *